US011631397B2

(12) United States Patent
Qin et al.

(10) Patent No.: US 11,631,397 B2
(45) Date of Patent: Apr. 18, 2023

(54) VOICE ALIGNMENT METHOD AND APPARATUS

(71) Applicant: HUAWEI TECHNOLOGIES CO., LTD., Guangdong (CN)

(72) Inventors: Zhen Qin, Xi'an (CN); Qiang Ye, Xi'an (CN); Guangjian Tian, Hong Kong (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 320 days.

(21) Appl. No.: 17/068,131

(22) Filed: Oct. 12, 2020

(65) Prior Publication Data

US 2021/0027769 A1    Jan. 28, 2021

Related U.S. Application Data

(63) Continuation of application No. PCT/CN2019/088591, filed on May 27, 2019.

(30) Foreign Application Priority Data

May 28, 2018  (CN) .......................... 201810519857.2

(51) Int. Cl.
*G10L 15/10*    (2006.01)
*G10L 25/06*    (2013.01)
*G10L 25/60*    (2013.01)

(52) U.S. Cl.
CPC .............. *G10L 15/10* (2013.01); *G10L 25/06* (2013.01); *G10L 25/60* (2013.01)

(58) Field of Classification Search
CPC ....... G10L 15/10; H04L 49/55; H04L 49/555; H04M 3/2236; H04J 3/0632
See application file for complete search history.

(56) References Cited

U.S. PATENT DOCUMENTS 5,625,627 A    4/1997  Ishi
6,389,111 B1 *  5/2002  Hollier ................ H04M 3/2236
                                                 379/1.01

(Continued)

FOREIGN PATENT DOCUMENTS

CN           1553597 A     12/2004
CN          101111041 A      1/2008
(Continued)

OTHER PUBLICATIONS

L. O. Nunes, L. W. P. Biscainho, B. Lee, A. Said, T. Kalker and R. W. Schafer, "Degradation Type Classifier for Full Band Speech Contaminated With Echo, Broadband Noise, and Reverberation," in IEEE Transactions on Audio, Speech, and Language Processing, vol. 19, doi: 10.1109/TASL.2011.2144973. (Year: 2011).*

(Continued)

*Primary Examiner* — Richemond Dorvil
*Assistant Examiner* — Alexander G Marlow
(74) *Attorney, Agent, or Firm* — Huawei Technologies Co., Ltd.

(57) ABSTRACT

Example methods and apparatus for providing voice alignment are described. One example method including: obtaining an original voice and a test voice, the test voice is a voice generated after the original voice is transmitted over a communications network; performing loss detection and/or discontinuity detection on the test voice, the loss detection is used to determine whether the test voice has a voice loss compared with the original voice, and the discontinuity detection is used to determine whether the test voice has voice discontinuity compared with the original voice; and aligning the test voice with the original voice based on a result of the loss detection and/or the discontinuity detection, to obtain an aligned original voice and an aligned test voice, the result of the loss detection and/or the discontinuity (Continued)

detection is used to indicate a manner of aligning the test voice with the original voice.

17 Claims, 15 Drawing Sheets

(56) References Cited

U.S. PATENT DOCUMENTS

| | | | | |
|---|---|---|---|---|
| 6,499,009 | B1* | 12/2002 | Lundberg | H04L 1/242 704/211 |
| 7,197,010 | B1* | 3/2007 | Berstein | H04L 43/00 370/252 |
| 2003/0023435 | A1 | 1/2003 | Josephson | |
| 2005/0216260 | A1* | 9/2005 | Ps | G10L 25/69 704/E19.002 |
| 2007/0033027 | A1 | 2/2007 | Yao | |
| 2010/0106489 | A1* | 4/2010 | Beerends | G10L 25/69 704/207 |
| 2011/0295599 | A1 | 12/2011 | Grancharov et al. | |
| 2012/0143601 | A1* | 6/2012 | Beerends | G10L 25/69 704/200 |
| 2014/0180457 | A1 | 6/2014 | Thakur et al. | |
| 2015/0199959 | A1* | 7/2015 | Skoglund | G10L 25/60 704/239 |
| 2017/0117006 | A1* | 4/2017 | Beerends | G10L 25/69 |

FOREIGN PATENT DOCUMENTS

| | | | | |
|---|---|---|---|---|
| CN | 101466116 | A | 6/2009 | |
| CN | 101771869 | A | 7/2010 | |
| CN | 101996662 | A | 3/2011 | |
| CN | 102044247 | A | 5/2011 | |
| CN | 102044248 | A | 5/2011 | |
| CN | 102543080 | A | 7/2012 | |
| CN | 103077727 | A | 5/2013 | |
| CN | 103474083 | A | 12/2013 | |
| CN | 103685795 | A | 3/2014 | |
| CN | 104376850 | A | 2/2015 | |
| CN | 104464755 | A | 3/2015 | |
| CN | 105989837 | A | 10/2016 | |
| EP | 1119957 | A1 | 8/2001 | |
| EP | 2388779 | B1 | 2/2013 | |
| JP | 2000148178 | A | 5/2000 | |
| KR | 20090045941 | A * | 5/2009 | H04N 17/004 |
| WO | 0022803 | A1 | 4/2000 | |
| WO | WO-0022803 | A1 * | 4/2000 | H04M 3/2236 |
| WO | 02087137 | A2 | 10/2002 | |

OTHER PUBLICATIONS

Andrew Hines, Jan Skoglund, Anil C Kokaram, and Naomi Harte "ViSQOL: an objective speech quality model" Hines et al. Journal on Audio, Speech, and Music Processing (2015) 2015:13 DOI 10.1186/s13636-015-0054-9 (Year: 2015).*

N. Harlander, R. Huber, and ST. D.. Ewert, "Sound Quality Assessment Using Auditory Models," J. Audio Eng. Soc., vol. 62, No. 5, pp. 324-336, (May 2014.). doi: https://doi.org/10.17743/jaes.2014.0020 (Year: 2014).*

A. Avila, B. Cauchi, S. Goetze, S. Doclo and T. Falk, "Performance comparison of intrusive and non-intrusive instrumental quality measures for enhanced speech," 2016 IEEE International Workshop on Acoustic Signal Enhancement (IWAENC), 2016, pp. 1-5, doi: 10.1109/IWAENC.2016.7602907. (Year: 2016).*

P. Počta and J. G. Beerends, "Subjective and Objective Assessment of Perceived Audio Quality of Current Digital Audio Broadcasting Systems and Web-Casting Applications," in IEEE Transactions on Broadcasting, vol. 61, No. 3, pp. 407-415, Sep. 2015, doi: 10.1109/TBC.2015.2424373. (Year: 2015).*

Alex Loscos et al. Low-delay singing voice alignment to text, ICMC 1999. pp. 437-440.

Wang Li et al. A Survey of Key Technologies and Applications on Heterogeneous Network Alignment in Social Network Big Data, Journal of Taiyuan University of Technology,vol. 48 No. 3, May 2017, total 5 pages. With English abstract.

Zhen Qin et al, Long Distance Voice Channel Diagnosis Using Deep Neural Networks, Interspeech 2018, Sep. 2-6, 2018, Hyderabad, 4 pages.

* cited by examiner

US 11,631,397 B2

VOICE ALIGNMENT METHOD AND APPARATUS

CROSS-REFERENCE TO RELATED APPLICATIONS

This application is a continuation of International Application No. PCT/CN 2019/088591, filed on May 27, 2019, which claims priority to Chinese Patent Application No. CN 201810519857.2 filed on May 28, 2018. The disclosures of the aforementioned applications are hereby incorporated by reference in their entireties.

TECHNICAL FIELD

This application relates to the audio field, and in particular, to a voice alignment method and apparatus.

BACKGROUND

Abnormal voice recognition on a communications network is one of problems confronting telecom operators. Restricted by a user privacy protection policy, operation and maintenance engineers can only recognize abnormal voices during follow-up repeated dialing tests, to reproduce a scenario of the abnormal voices and verify effect after the problem is resolved.

A method for improving efficiency of recognizing a problematic voice is to input an original voice and a test voice into an algorithm model, and identify an abnormal phenomenon of the test voice by using the algorithm model. To improve accuracy of abnormal voice recognition, an alignment operation needs to be performed on the original voice and the test voice. To be specific, start time domain locations and end time domain locations of the original voice and the test voice are aligned. However, a result obtained according to an existing voice alignment method may have a relatively large error, and this error can be overcome only through a plurality of algorithms and a plurality of times of processing.

SUMMARY

This application provides a voice alignment method and apparatus. Before an original voice is aligned with a test voice, whether the test voice has a voice loss and/or voice discontinuity is first detected, and an appropriate algorithm is selected based on a detection result to align the test voice with the original voice, thereby improving efficiency of voice alignment.

According to a first aspect, a voice alignment method is provided, including: obtaining an original voice and a test voice, where the test voice is a voice generated after the original voice is transmitted over a communications network; performing loss detection and/or discontinuity detection on the test voice, where the loss detection is used to determine whether the test voice has a voice loss compared with the original voice, and the discontinuity detection is used to determine whether the test voice has voice discontinuity compared with the original voice; and aligning the test voice with the original voice based on a result of the loss detection and/or the discontinuity detection, to obtain an aligned test voice and an aligned original voice, where the result of the loss detection and/or the discontinuity detection is used to indicate a manner of aligning the test voice with the original voice.

For example, if the detection result is that the test voice has no voice loss and relatively long period of voice discontinuity, statements included in the original voice and statements included in the test voice may be sequentially aligned, to determine whether there is another abnormal phenomenon in the test voice. That the test voice has no relatively long period of voice discontinuity means that a delay between the statements of the test voice and the statements of the original voice is less than a delay threshold. For another example, if the detection result is that a first statement of the test voice is lost, the statements except a first statement included in the original voice and the statements included in the test voice can be sequentially aligned, to determine whether there is another abnormal phenomenon in the test voice. For still another example, if the detection result is that the test voice has no voice loss but has a relatively long period of voice discontinuity, in other words, the delay between the statements of the test voice and the statements of the original voice is greater than the delay threshold, the delay threshold may be increased to further determine whether there is another abnormal phenomenon in the test voice, and whether to further perform abnormality detection.

Therefore, according to the voice alignment method provided in this application, the voice alignment method is determined based on the result of the loss detection and/or the discontinuity detection, and voice alignment may be performed based on a specific status of the test voice by using a most suitable method, thereby improving efficiency of the voice alignment.

In one embodiment, the original voice includes a first original statement, the test voice includes a first test statement, and the first original statement corresponds to the first test statement. The aligning the test voice with the original voice based on a result of the loss detection and/or the discontinuity detection includes:

inserting a first silent statement before a start time domain location of the first test statement when the test voice has no voice loss and/or voice discontinuity, and the start time domain location of the first test statement is before a start time domain location of the first original statement, to enable the start time domain location of the first test statement to be aligned with the start time domain location of the first original statement, where duration of the first silent statement is equal to a time difference between the start time domain location of the first test statement and the start time domain location of the first original statement.

In one embodiment, the original voice includes a first original statement, the test voice includes a first test statement, and the first original statement corresponds to the first test statement. The aligning the test voice with the original voice based on a result of the loss detection and/or the discontinuity detection includes:

deleting a second silent statement before a start time domain location of the first test statement when the test voice has no voice loss and/or voice discontinuity, and the start time domain location of the first test statement is after a start time domain location of the first original statement, where duration of the second silent statement is equal to a time difference between the start time domain location of the first test statement and the start time domain location of the first original statement.

One voice segment may be divided into a plurality of statements, and each statement is a set of a plurality of frames whose amplitude values exceed a preset amplitude threshold. There is a silent period between any two adjacent statements. The silent period may be an audio segment in which no voice activity is detected, and the silent period may also be a set of at least one frame whose amplitude value is less than the preset amplitude threshold, for example, the silent period is a pause between two sentences. When the test voice has no voice loss and/or voice discontinuity, start time domain locations of the original voice and the test voice are first aligned according to a solution provided in this embodiment. When the start time domain location of the first test statement is before the start time domain location of the first original statement, a silent voice segment, namely, the first silent statement, is inserted before the first test statement, and the duration of the first silent statement is equal to the time difference between the start time domain location of the first test statement and the start time domain location of the first original statement; and when the start time domain location of the first test statement is after the start time domain location of the first original statement, a silent voice segment, namely, the second silent statement is deleted before the first test statement, and duration of the second silent statement is equal to a time difference between the start time domain location of the first test statement and the start time domain location of the first original statement. In this way, the statements of the original voice with the statements of the test voice are aligned.

In one embodiment, before the inserting a first silent statement before a start time domain location of the first test statement, or before the deleting a second silent statement before a start time domain location of the first test statement, the aligning the test voice with the original voice based on a result of the loss detection and/or the discontinuity detection further includes:

determining at least two original statements based on a silent period in the original voice, where the at least two original statements include the first original statement, and the silent period in the original voice is used to indicate locations at which the at least two original statements are divided; and determining at least two test statements based on a silent period in the test voice, where the at least two test statements include the first test statement, and the silent period in the test voice is used to indicate locations at which the at least two test statements are divided.

The silent period may also be referred to as a silent statement or a silent voice, and means an audio segment in which no voice activity is detected, or a set of at least one frame whose amplitude value is less than a preset amplitude threshold, for example, an audio segment corresponding to a pause period between two sentences. According to a technical solution provided in this embodiment, abnormal voice recognition may be performed only on the test statement (or an audio segment with a voice activity) in the test voice, and is not performed on the silent statement (or the silent period) in the test voice. For example, duration of the test voice and duration of the original voice are both 10 seconds, and if a start location of the test voice and a start location of the original voice respectively have a silent period of 1 second, a voice alignment apparatus can perform abnormal voice recognition on the test voice by starting from a location of the 1st second of the test voice, but does not perform abnormal voice recognition on a part from the 0th second to the 1st second of the test voice. This reduces workload of recognizing an abnormal voice and improves efficiency of recognizing the abnormal voice.

In one embodiment, before the inserting a first silent statement before a start time domain location of the first test statement, or before the deleting a second silent statement before a start time domain location of the first test statement, the aligning the test voice with the original voice based on a result of the loss detection and/or the discontinuity detection further includes:

determining a first test sub-statement and a second test sub-statement based on a wave trough of the first test statement, where the wave trough is a voice fragment whose amplitude average value of frames is less than or equal to an amplitude threshold in the first test statement, and the wave trough is used to indicate locations at which the first test sub-statement and the second test sub-statement are divided;

determining a first original sub-statement based on a cross-correlation coefficient and the first test sub-statement, where the cross-correlation coefficient is used to indicate a similarity between a voice segment of the first original statement and the first test sub-statement, and the first original sub-statement is a voice segment that is in voice segments of the first original statement and that has a highest similarity to the first test sub-statement; and aligning the first test sub-statement with the first original sub-statement based on a time offset of a first time domain location relative to a second time domain location and by using a time domain location of the first original sub-statement as a reference location, where the first time domain location is a time domain location of the first test sub-statement in the first test statement, and the second time domain location is a time domain location of the first original sub-statement in the first original statement.

The wave trough may be a short pause in a sentence. Therefore, the first test statement may be divided into at least two test sub-statements based on the wave trough, and the two test sub-statements are aligned, so that an alignment result between the first test statement and the first original statement is more precise, which helps improve accuracy of subsequent abnormal voice recognition.

In one embodiment, the aligning the first test sub-statement with the first original sub-statement based on a time offset of a first time domain location relative to a second time domain location and by using a time domain location of the first original sub-statement as a reference location includes: when the time offset is less than or equal to a delay threshold, aligning the first test sub-statement with the first original sub-statement based on the time offset of the first time domain location relative to the second time domain location and by using the time domain location of the first original sub-statement as the reference location.

When the time offset is greater than the delay threshold, it indicates that a delay between the first test sub-statement and the first original sub-statement is relatively large, the delay is probably caused by a voice loss or a relatively long period of voice discontinuity, alignment may not be performed on the first test sub-statement, and an abnormal result is directly output. When the time offset is less than delay threshold, it indicates that the delay between the first test sub-statement and the first original sub-statement is relatively short, the delay may be caused by a relatively short period of voice discontinuity, or may be a normal delay caused by communications network transmission, alignment may be performed on the first test sub-statement, to determine whether there is another abnormal phenomenon in the first test sub-statement. According to the foregoing method, whether to perform intra-statement alignment may be determined based on an actual situation, thereby improving flexibility of statement alignment.

In one embodiment, the aligning the test voice with the original voice based on a result of the loss detection and/or the discontinuity detection further includes:

adding a third silent statement after an end time domain location of the test voice when the end time domain location of the test voice is before an end time domain location of the original voice, where duration of the third silent statement is equal to a time difference between the end time domain location of the test voice and the end time domain location of the original voice.

In one embodiment, the aligning the test voice with the original voice based on a result of the loss detection and/or the discontinuity detection further includes:

deleting a fourth silent statement after an end time domain location of the test voice when the end time domain location of the test voice is after an end time domain location of the original voice, where duration of the fourth silent statement is equal to a time difference between the end time domain location of the test voice and the end time domain location of the original voice.

After alignment is performed on each statement of the original voice and each statement of the test voice, duration of the test statement may change because alignment may be performed inside the test statement. Therefore, after the statements of the original voice are aligned with the statements of the test voice, there may be a time offset between the end time domain location of the original voice and the end time domain location of the test voice. According to the foregoing method, the end time domain location of the original voice and the end time domain location of the test voice can be aligned.

In one embodiment, before the aligning the test voice with the original voice based on a result of the loss detection and/or the discontinuity detection, the method further includes:

detecting the original voice and the test voice based on a preset abnormal voice detection model, to determine whether the test voice is an abnormal voice, where the preset abnormal voice detection model is a non-machine learning model, content detected by the non-machine learning model is different from content detected by the loss detection, and/or content detected by the non-machine learning model is different from content detected by the discontinuity detection.

In one embodiment, the method further includes:

detecting the aligned test voice based on a machine learning model and the aligned original voice, to determine whether the aligned test voice is an abnormal voice, or determine an abnormal type of the aligned test voice.

The preset abnormal voice detection model is usually one of some detection models for common abnormal voices, and these detection models are specially designed for common abnormal voices and can quickly detect one or more common abnormal voices. However, the preset abnormal voice detection model cannot detect an uncommon abnormal voice. In addition, the preset voice detection model may fail to detect a common abnormal voice. According to the solution provided in this embodiment, the preset abnormal voice detection model is first used to detect a common abnormal voice, then the machine learning model is used to detect an uncommon abnormal voice, and the machine learning model is used to detect the common abnormal voice again, thereby improving a success rate of abnormal voice detection.

According to a second aspect, a voice alignment apparatus is provided. The apparatus may implement functions corresponding to the operations in the method in the first aspect, and the functions may be implemented by hardware, or may be implemented by hardware executing corresponding software. The hardware or software includes one or more units or modules corresponding to the foregoing functions.

In one embodiment, the apparatus includes a processor and a communications interface. The processor is configured to support the apparatus to perform corresponding functions in the method in the first aspect. The communications interface is configured to support communication between the apparatus and another network element. The apparatus may further include a memory. The memory is configured to couple with the processor, and stores a program instruction and data that are necessary for the apparatus.

According to a third aspect, a computer-readable storage medium is provided. The computer-readable storage medium stores computer program code, and when the computer program code is executed by a processing unit or a processor, a voice alignment apparatus is enabled to perform the method described in the first aspect.

According to a fourth aspect, a chip is provided. The chip stores an instruction, and when the instruction runs on a voice alignment apparatus, the chip is enabled to perform the method in the first aspect.

According to a fifth aspect, a computer program product is provided. The computer program product includes a computer program code, and when the computer program code is run by a communications unit or a communications interface, and a processing unit or a processor of a voice alignment apparatus, the voice alignment apparatus is enabled to perform the method in the first aspect.

DETAILED DESCRIPTION OF EMBODIMENTS

An abnormal voice indicates a phenomenon that a user subjectively perceives poor voice quality during a call. A common abnormal voice includes at least one of the following phenomena:

Mute voice: During a call, at least one party cannot hear a voice of the other party.

Discontinuity: During a call, a called party can hear a voice of the other party, but the voice is discontinuous.

Low energy: During transmission, a voice energy loss is excessively high. As a result, during a call, a called party can hear a voice of the other party, but the voice is very low.

Noise: During a call, interference noise, such as a metal sound and a water flow sound, is mixed in a normal voice. As a result, a user feels uncomfortable in hearing.

Low quality: During a call, a phenomenon of voice content loss, voice distortion, or echo occurs. As a result, a user feels uncomfortable in hearing.

The following describes technical solutions in this application with reference to the accompanying drawings.

Figure 1:
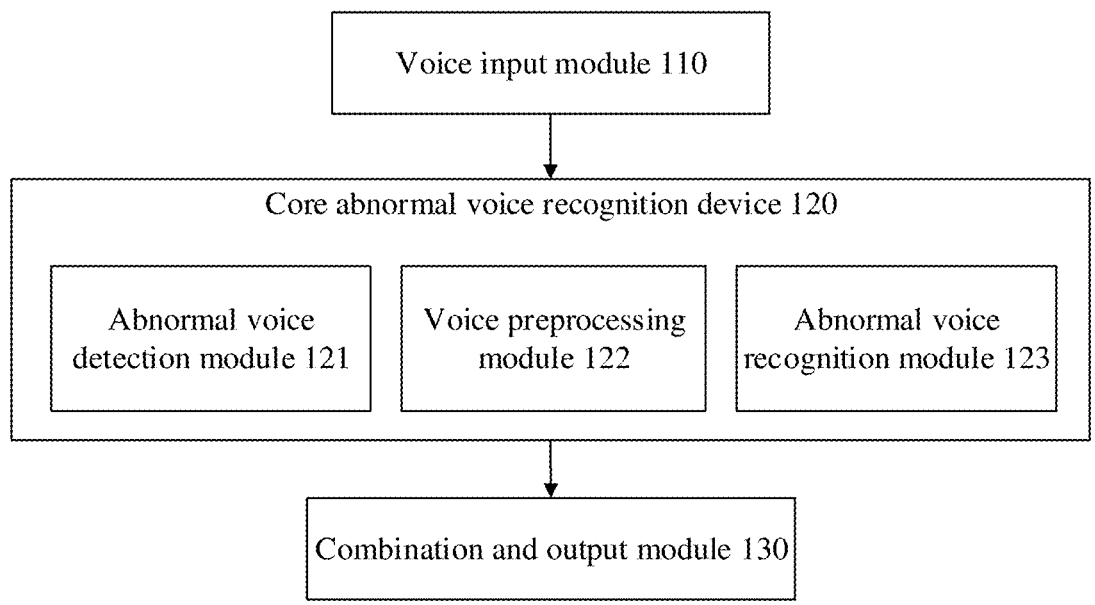
FIG. 1 is a schematic diagram of a structure of an abnormal voice recognition system according to this application.

FIG. 1 shows a schematic diagram of an abnormal voice recognition system applicable to this application. The system 100 includes: a voice input module 110, an abnormal voice detection module 121, a voice preprocessing module 122, an abnormal voice recognition module 123, and a combination and output module 130.

The voice input module 110 is configured to convert a sampling rate of an input voice. When a sampling rate of an input original voice is different from a sampling rate of a test voice, the voice input module 110 may convert the sampling rate of the original voice and the sampling rate of the test voice into a same sampling rate. The test voice is a voice obtained after the original voice is transmitted over a communications network. For example, a sampling rate of the test voice is 16 K, and a sampling rate of the original voice is 8 K. The voice input module 110 can reduce the sampling rate of the test voice to 8 K before inputting the original voice and the test voice into an abnormal voice detection module 121.

The abnormal voice detection module 121 is configured to detect, based on a non-machine learning model, whether there is an abnormality in the test voice and a specific type of the abnormality. The non-machine learning model includes, for example, an acoustic echo detection model, a discontinuity detection model, and a background noise detection model. The abnormality includes, for example, low quality, discontinuity, and noise.

The voice preprocessing module 122 is configured to align the test voice with the original voice, to facilitate subsequent abnormal voice detection. In this application, voice alignment means aligning start time domain locations and end time domain locations of two voice segments. Because voice segments of the two voice segments after the alignment are in one-to-one correspondence, an abnormal voice can be recognized more easily when abnormal voice detection is performed on the two voice segments after the alignment.

The abnormal voice recognition module 123 is configured to detect, based on a machine learning model, whether there is an abnormality in the test voice and a specific type of the abnormality. The machine learning model includes, for example, a random forest model and a deep neural network model.

The abnormal voice detection module 121, the voice preprocessing module 122, and the abnormal voice recognition module 123 may be standalone modules or modules integrated together. For example, the abnormal voice detection module 121, the voice preprocessing module 122, and the abnormal voice recognition module 123 are integrated in a core abnormal voice recognition device 120.

The combination and output module 130 is configured to combine and output results of detecting an abnormal voice by the abnormal voice detection module 121 and the abnormal voice recognition module 123. The combination processing means combining two same results obtained through detection by the abnormal voice detection module 121 and the abnormal voice recognition module 123 into one result. For example, if both the abnormal voice detection module 121 and the abnormal voice recognition module 123 detect noise in the test voice, the combination and output module 130 combines two voice abnormalities (with noise) detected by the abnormal voice detection module 121 and the abnormal voice recognition module 123, and then outputs only one voice abnormality. For another example, if the abnormal voice detection module 121 detects discontinuity in the test voice, and the abnormal voice recognition module 123 identifies noise in the test voice, the combination and output module 130 may output two voice abnormalities, that is, the test voice has discontinuity and noise.

The system 100 is merely an example of the abnormal voice recognition system applicable to this application. The abnormal voice recognition system applicable to this application may further include more or less modules than the system 100. For example, the abnormal voice recognition system applicable to this application may further include a display module, or the abnormal voice recognition system applicable to this application may not include the combination and output module 130.

The following describes in detail, based on the abnormal voice recognition system 100 shown in FIG. 1 as an example, an abnormal voice recognition method provided in this application.

Figure 2:
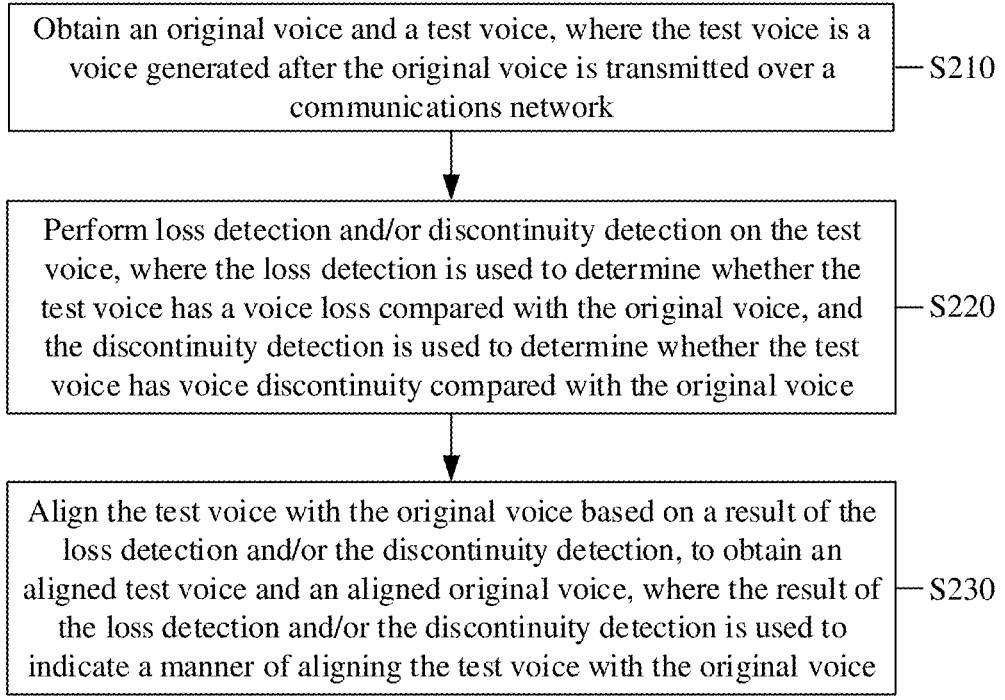
FIG. 2 is a schematic flowchart of a voice alignment method according to this application.

FIG. 2 shows a schematic flowchart of a voice alignment method according to this application. The method 200 includes the following operations:

S210. Obtain an original voice and a test voice, where the test voice is a voice generated after the original voice is transmitted over a communications network.

S210 may be performed by the abnormal voice detection module 121 or the abnormal voice recognition module 123.

Obtaining an original voice and a test voice may be receiving an original voice and a test voice from the voice input module 110. The original voice and the test voice from the voice processing module 110 may be voices with a same sampling rate. In one embodiment, obtaining an original voice and a test voice may also be obtaining voices at different sampling rates by using another module.

S220. Perform loss detection and/or discontinuity detection on the test voice, where the loss detection is used to determine whether the test voice has a voice loss compared with the original voice, and the discontinuity detection is used to determine whether the test voice has voice discontinuity compared with the original voice.

The voice loss is one of the foregoing low-quality abnormal voices. A method for performing loss detection and/or discontinuity detection on the test voice may be performed by the abnormal voice detection module 121 or the abnormal voice recognition module 123. For a specific detection method, refer to a loss detection method and a discontinuity detection method in the prior art. For brevity, details are not described herein again.

S230. Align the test voice with the original voice based on a result of the loss detection and/or the discontinuity detection, to obtain an aligned test voice and an aligned original voice, where the result of the loss detection and/or the discontinuity detection is used to indicate a manner of aligning the test voice with the original voice.

S230 may be performed by the voice preprocessing module 122. For example, if the detection result is that the test voice has no voice loss and relatively long period of voice discontinuity, statements included in the original voice and statements included in the test voice may be sequentially aligned. That the test voice has no relatively long period of voice discontinuity means that a delay between the statements of the test voice and the statements of the original voice is less than a delay threshold. For another example, if the detection result is that a first statement of the test voice is lost, the statements except a first statement included in the original voice and the statements included in the test voice can be sequentially aligned. For still another example, if the detection result is that the test voice has no voice loss but has a relatively long period of voice discontinuity, in other words, the delay between the statements of the test voice and the statements of the original voice is greater than the delay threshold, the delay threshold may be increased to further determine whether there is another abnormal phenomenon in the test voice, and whether to further perform abnormality detection; or the test voice may not be aligned with the original voice again, and an abnormal result is directly output.

Therefore, according to the voice alignment method provided in this application, the voice alignment method is determined based on the result of the loss detection and/or the discontinuity detection, and voice alignment may be performed based on a specific status of the test voice by using a most suitable method, thereby improving efficiency of the voice alignment.

It should be noted that, even if the original voice and the test voice that are used when S220 is performed are voices at different sampling rates, to ensure precision of an alignment result (or referred to as "accuracy of an alignment result"), when the test voice and original voice are aligned, the sampling rates of the test voice and original voice need to be converted into a same sampling rate.

It should be understood that the method 200 may be implemented by using program code running on a general-purpose processor, or may be implemented by using a dedicated hardware device, or may be implemented by using a combination of software and hardware (the program code is combined with the dedicated hardware device).

In one embodiment, the original voice includes a first original statement, the test voice includes a first test statement, and the first original statement corresponds to the first test statement. S230 includes:

inserting a first silent statement before a start time domain location of the first test statement when the test voice has no voice loss and/or voice discontinuity, and the start time domain location of the first test statement is before a start time domain location of the first original statement, to enable the start time domain location of the first test statement to be aligned with the start time domain location of the first original statement, where duration of the first silent statement is equal to a time difference between the start time domain location of the first test statement and the start time domain location of the first original statement; or deleting a second silent statement before a start time domain location of the first test statement when the test voice has no voice loss and/or voice discontinuity, and the start time domain location of the first test statement is after a start time domain location of the first original statement, where duration of the second silent statement is equal to a time difference between the start time domain location of the first test statement and the start time domain location of the first original statement.

One voice segment may be divided into a plurality of statements, and each statement is a set of a plurality of frames whose amplitude values exceed a preset amplitude threshold. There is a silent period between any two adjacent statements. The silent period may be an audio segment in which no voice activity is detected, and the silent period may also be a set of at least one frame whose amplitude value is less than the preset amplitude threshold, for example, the silent period is a pause between two sentences.

The first original statement is any statement in the original voice. The original voice may include only the first original statement, or may include a statement other than the first original statement. Correspondingly, the test voice may include only the first test statement, or may include a statement other than the first test statement.

When the test voice has no voice loss and/or voice discontinuity, start time domain locations of the original voice and the test voice are first aligned according to a solution provided in this embodiment. When the start time domain location of the first test statement is before the start time domain location of the first original statement, a silent voice segment, namely, the first silent statement, is inserted before the first test statement, and the duration of the first silent statement is equal to the time difference between the start time domain location of the first test statement and the start time domain location of the first original statement; and when the start time domain location of the first test statement is after the start time domain location of the first original statement, a silent voice segment, namely, the second silent statement is deleted before the first test statement, and duration of the second silent statement is equal to a time difference between the start time domain location of the first test statement and the start time domain location of the first original statement. In this way, the statements of the original voice with the statements of the test voice are aligned.

It should be noted that, the "inserting" refers to adding a silent voice segment to any time domain location before the start time domain location of the first test statement, so that the first test statement moves for a distance along a time axis direction as a whole. For example, both the start time domain location of the original voice and the start time domain location of the test voice are 0 seconds, in other words, the start time domain locations of the original voice and the test voice are in an alignment status. The start time domain location of the first original statement is 10 s, and the start time domain location of the first test statement is 5 s, in other words, the start time domain location of the first test statement is before the start time domain location of the first original statement. In this case, a silent voice (namely, the first silent statement) may be inserted at any point in time domain locations of Os to 5s of the test voice, so that the first test statement entirely moves backward by 5s along the time axis direction. In this way, the start time domain location of the first test statement with the start time domain location of the first original statement are aligned.

FIG. 3 to FIG. 6 separately show a method for aligning a test statement with an original statement according to this application.

Figure 3:
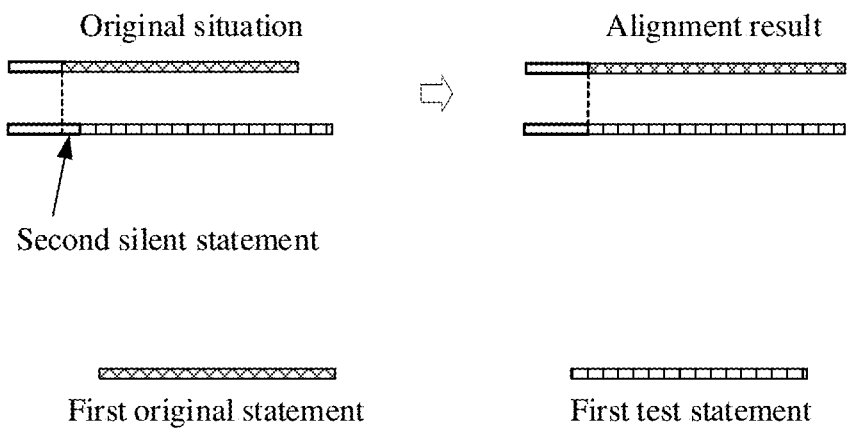
FIG. 3 is a schematic diagram of a method for aligning a test statement with an original statement according to this application.

As shown in FIG. 3, a location (a first location) of the first test statement in the test voice is a period of time after a location (a second location) of the first original statement in the original voice. To align the first original statement with the first test statement, a silent voice segment may be deleted before the first test statement. The deleted silent voice segment is referred to as the second silent statement, and the duration of the second silent statement is equal to delayed duration of the first location relative to the second location, so that the first original statement and the first test statement are aligned.

It should be noted that, in this application, for brevity of description, "time domain location" is sometimes referred to as "location".

Figure 4:
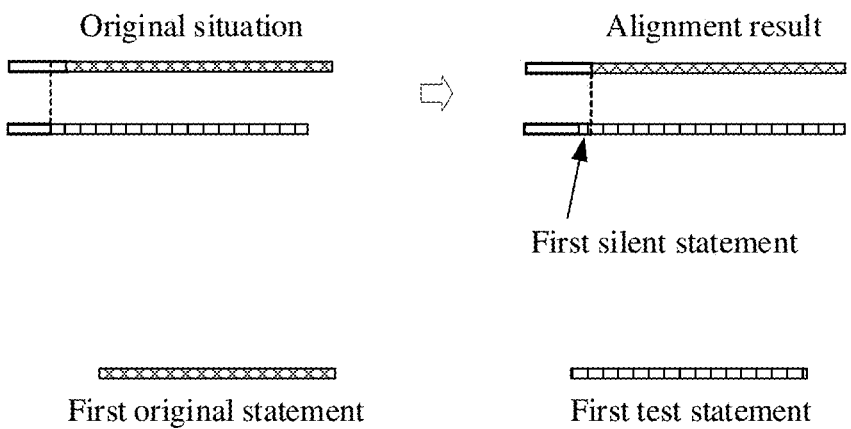
FIG. 4 is a schematic diagram of another method for aligning a test statement with an original statement according to this application.

As shown in FIG. 4, the location (the first location) of the first test statement in the test voice is a period of time before the location (the second location) of the first original statement in the original voice. To align the first original statement with the first test statement, a silent voice segment may be added before the first test statement. The added silent voice segment is referred to as the first silent statement, and the duration of the first silent statement is equal to advanced duration of the first location relative to the second location, so that the first original statement and the first test statement are aligned.

Figure 5:
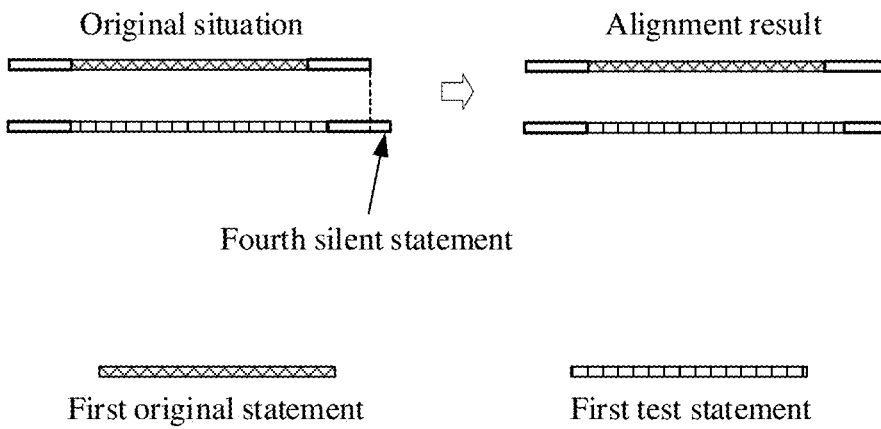
FIG. 5 is a schematic diagram of still another method for aligning a test statement with an original statement according to this application.

As shown in FIG. 5, the first test statement is the last statement of the test voice, the first original statement is the last statement of the original voice, and the start time domain location of the first test statement is aligned with that of the first original statement. Because alignment is performed inside the first test statement (for example, a sub-statement of the first test statement is aligned with a sub-statement of the first original statement), and duration of the first test statement becomes longer, an end location of the test voice is after an end location of the original voice. To align the test voice with the original voice, a silent voice segment may be deleted before the end location of the test voice, and the deleted silent voice segment is referred to as a fourth silent statement. Duration of the fourth silent statement is equal to delayed duration of the end location of the test voice relative to the end location of the original voice, so that the original voice and the test statement are aligned.

Figure 6:
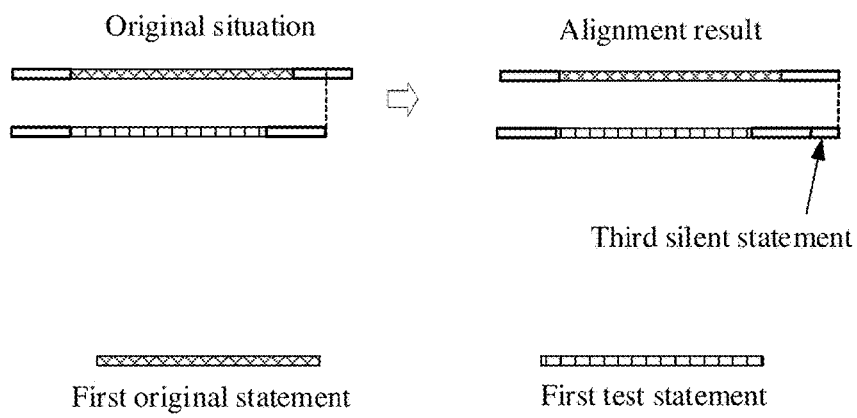
FIG. 6 is a schematic diagram of yet another method for aligning a test statement with an original statement according to this application.

As shown in FIG. 6, the first test statement is the last statement of the test voice, the first original statement is the last statement of the original voice, and the start time domain location of the first test statement is aligned with that of the first original statement. Because alignment is performed inside the first test statement (for example, the sub-statement of the first test statement is aligned with the sub-statement of the first original statement), and the duration of the first test statement becomes shorter, the end location of the test voice is before the end location of the original voice. To align the test voice with the original voice, a silent voice segment may be added after the end location of the test voice, and the added silent voice segment is referred to as a third silent statement. Duration of the third silent statement is equal to advanced duration of the end location of the test voice relative to the end location of the original voice, so that the original voice and the test statement are aligned.

In one embodiment, before the adding a first silent statement before a start time domain location of the first test statement, or before the deleting a second silent statement before a start time domain location of the first test statement, S230 further includes:

determining at least two original statements based on a silent period in the original voice, where the at least two original statements include the first original statement, and the silent period in the original voice is used to indicate locations at which the at least two original statements are divided; and determining at least two test statements based on a silent period in the test voice, where the at least two test statements include the first test statement, and the silent period in the test voice is used to indicate locations at which the at least two test statements are divided.

The silent period may also be referred to as a silent statement or a silent voice, and means an audio segment in which no voice activity is detected, or a set of at least one frame whose amplitude value is less than a preset amplitude threshold, for example, an audio segment corresponding to a pause period between two sentences. According to a technical solution provided in this embodiment, abnormal voice recognition may be performed only on the test statement (or an audio segment with a voice activity) in the test voice, and is not performed on the silent statement (or the silent period) in the test voice. For example, duration of the test voice and duration of the original voice are both 10 seconds, and if a start location of the test voice and a start location of the original voice respectively have a silent period of 1 second, a voice alignment apparatus can perform abnormal voice recognition on the test voice by starting from a location of the 1st second of the test voice, but does not perform abnormal voice recognition on a part from the 0th second to the 1st second of the test voice. In this way, workload of recognizing an abnormal voice is reduced, and efficiency of recognizing the abnormal voice is improved.

Figure 7:
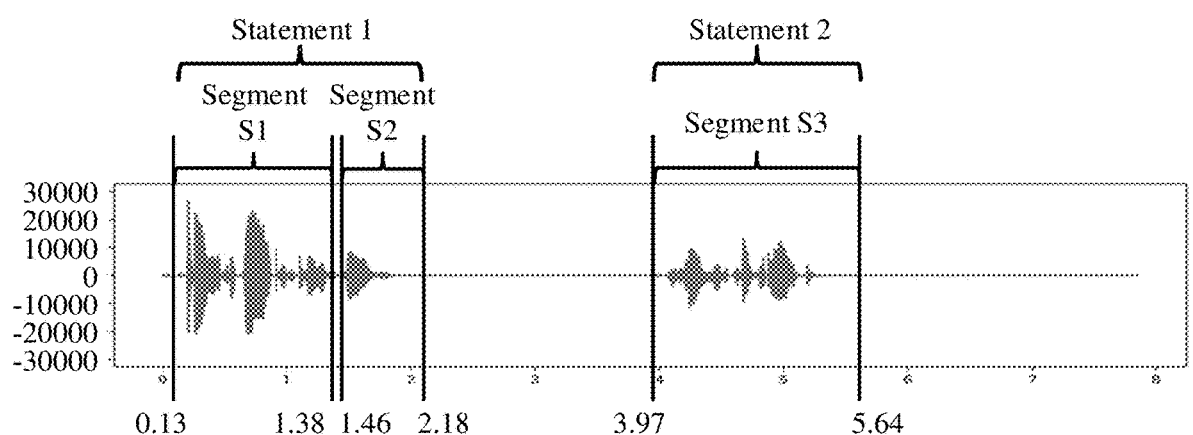
FIG. 7 is a schematic diagram of a statement division method according to this application.

FIG. 7 shows a schematic diagram of a statement division method according to this application.

In FIG. 7, a horizontal axis represents a time, and a vertical axis represents an amplitude. A voice segment may be divided into statements according to a voice activity detection (VAD) algorithm. The VAD algorithm may be set as follows: When a voice segment includes consecutive voice activities of at least 300 ms, the consecutive voice activities can be divided into a segment.

The voice shown in FIG. 7 includes three segments whose consecutive voice activity time exceeds 300 ms, and the voice may be divided into three segments.

After the segment division is completed, the following processing may be performed:

if an interval between an end point of a segment $S_i$ and a start point of a segment $S_{i+1}$ is less than a silent period threshold (for example, 200 ms), the segments $S_i$ and $S_{i+1}$ may be combined into one statement;

if the interval between the end point of the segment $S_i$ and the start point of the segment $S_{i+1}$ is not less than the silent period threshold, the segments $S_i$ and $S_{i+1}$ are divided into two statements; and if there is no other segment after the segment $S_i$, the processing ends after a last statement including $S_i$ is obtained.

In this way, statement division is completed.

In one embodiment, before the inserting a first silent statement before a start time domain location of the first test statement, or before the deleting a second silent statement before a start time domain location of the first test statement, S230 further includes:

determining a first test sub-statement and a second test sub-statement based on a wave trough of the first test statement, where the wave trough is a voice fragment whose amplitude average value of frames is less than or equal to an amplitude threshold in the first test statement, and the wave trough is used to indicate locations at which the first test sub-statement and the second test sub-statement are divided;

determining a first original sub-statement based on a cross-correlation coefficient and the first test sub-statement, where the cross-correlation coefficient is used to indicate a similarity between a voice segment of the first original statement and the first test sub-statement, and the first original sub-statement is a voice segment that is in voice segments of the first original statement and that has a highest similarity to the first test sub-statement; and aligning the first test sub-statement with the first original sub-statement based on a time offset of a first time domain location relative to a second time domain location and by using a time domain location of the first original sub-statement as a reference location, where the first time domain location is a time domain location of the first test sub-statement in the first test statement, and the second time domain location is a time domain location of the first original sub-statement in the first original statement.

The wave trough may be a short pause in a sentence. Therefore, the first test statement may be divided into at least two test sub-statements based on the wave trough, and the two test sub-statements are aligned, so that an alignment result between the first test statement and the first original statement is more precise, which helps improve accuracy of subsequent abnormal voice recognition.

In one embodiment, the aligning the first test sub-statement with the first original sub-statement based on a time offset of a first time domain location relative to a second time domain location and by using a time domain location of the first original sub-statement as a reference location includes:

when the time offset is less than or equal to a delay threshold, aligning the first test sub-statement with the first original sub-statement based on the time offset of the first time domain location relative to the second time domain location and by using the time domain location of the first original sub-statement as the reference location.

When the time offset is greater than the delay threshold, it indicates that a delay between the first test sub-statement and the first original sub-statement is relatively large, the delay is probably caused by a voice loss or a relatively long period of voice discontinuity, alignment may not be performed on the first test sub-statement, and an abnormal result is directly output. When the time offset is less than delay threshold, it indicates that the delay between the first test sub-statement and the first original sub-statement is relatively short, the delay may be caused by a relatively short period of voice discontinuity, or may be a normal delay caused by communications network transmission, alignment may be performed on the first test sub-statement, to determine whether there is another abnormal phenomenon in the first test sub-statement. According to the foregoing method, whether to perform intra-statement alignment may be determined based on an actual situation, thereby improving flexibility of statement alignment.

Figure 8:
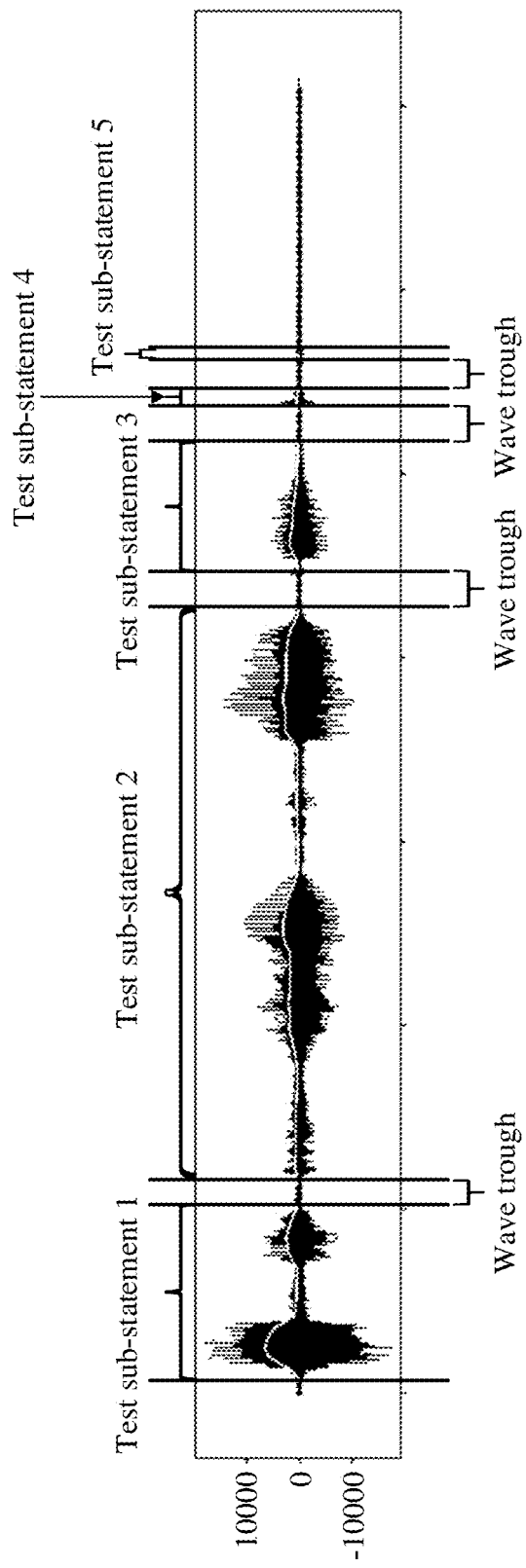
FIG. 8 is a schematic diagram of a sub-statement division method according to this application.

FIG. 8 shows a schematic diagram of a sub-statement division method according to this application.

The first test statement is divided into several frames based on a frame length of 20 ms and a frame shift of 10 ms, and an amplitude average value of voice waveforms in each frame is calculated. If an amplitude average value of the voice waveforms in a frame is less than 200, the frame is considered as a wave trough. The first test statement is divided into several sub-statements (namely, test sub-statements) by using the wave trough as a boundary point.

Based on the sub-statements obtained by dividing the first test statement in FIG. 8, a voice segment that is in a first original statement y and that corresponds to a test sub-statement $x_i$ ($x_i$ is any test sub-statement in the first test statement) is calculated, and a delay $\tau_i$ of $x_i$ relative to the voice segment is calculated. A calculation method is as follows:

$$\tau_i = \text{corr}(x_i, y) - p_{x_i},$$

$$\text{corr}(x_i, y) = \underset{n}{\arg\max}((x_i * y)(n)), 1 \le n \le N, \text{ and}$$

$$(x_i * y)(n) = \frac{1}{M}\sum_{m=1}^{M} x_i(m+n)y(m).$$

corr $(x_i, y)$ is a location, namely, a location of a voice segment corresponding to the test sub-statement $x_i$ in the first original statement y, that is most similar to the test sub-statement $x_i$ in the first original statement y and that is calculated by using the cross-correlation coefficient; $p_{x_i}$ is an offset of the test sub-statement X, in the first test statement; n is a deviation existing when the cross-correlation coefficient is calculated; N is a time length of the test sub-statement $x_i$; and M is a time length of the first original statement y. If $\tau_i$ is greater than a preset abnormal delay threshold, it indicates that $x_i$ has a relatively large delay relative to the original sub-statement in the first original statement, and the delay may be caused by a voice loss or a relatively long period of voice discontinuity. Alignment may not be performed on $x_i$, or, to determine whether $x_i$ has another abnormality, the abnormal delay threshold may be increased, so that abnormality detection can be further performed on $x_i$. If $\tau_i$ is less than the preset abnormal delay threshold, it indicates that $x_i$ has a relatively small delay relative to the original sub-statement in the first original statement, and the delay may be a delay caused by a relatively short period of voice discontinuity or a normal delay caused by communications network transmission. Alignment may be performed on $x_i$, so that whether $x_i$ has another abnormal phenomenon can be further determined.

In one embodiment, S230 further includes:

adding a third silent statement after an end time domain location of the test voice when the end time domain location of the test voice is before an end time domain location of the original voice, where duration of the third silent statement is equal to a time difference between the end time domain location of the test voice and the end time domain location of the original voice; or deleting a fourth silent statement after an end time domain location of the test voice when the end time domain location of the test voice is after an end time domain location of the original voice, where duration of the fourth silent statement is equal to a time difference between the end time domain location of the test voice and the end time domain location of the original voice.

After alignment is performed on each statement of the original voice and each statement of the test voice, duration of the test statement may change because alignment may be performed inside the test statement. Therefore, after the statements of the original voice are aligned with the statements of the test voice, there may be a time offset between the end time domain location of the original voice and the end time domain location of the test voice. According to the foregoing method, the end time domain location of the original voice and the end time domain location of the test voice can be aligned.

In one embodiment, before the aligning the test voice with the original voice based on a result of the loss detection and/or the discontinuity detection, the method 200 further includes the following operation:

detect the original voice and the test voice based on a preset abnormal voice detection model, to determine whether the test voice is an abnormal voice, where the preset abnormal voice detection model is a non-machine learning model, content detected by the non-machine learning model is different from content detected by the loss detection, and/or content detected by the non-machine learning model is different from content detected by the discontinuity detection.

If the loss detection is performed in S220, the loss detection is not performed in the foregoing operation again. If the discontinuity detection is performed in S220, the discontinuity detection is not performed in the foregoing operation again. If the loss detection and the discontinuity detection are performed in S220, the loss detection and the discontinuity detection are not performed in the foregoing operation again. Therefore, repeated detection is avoided, and detection efficiency is improved.

The foregoing operation may be performed at any moment before S230.

Because the preset abnormal voice detection model is usually one of some detection models (non-machine learning models) for common abnormal voices, and these detection models are strongly pertinent and can quickly detect one or more common abnormal voices, whether the test voice has a common abnormal phenomenon can be quickly determined in the foregoing operation.

In one embodiment, the method 200 further includes the following operation:

detect the aligned test voice based on a machine learning model and the aligned original voice, to determine whether the aligned test voice is an abnormal voice, or determine an abnormal type of the aligned test voice.

The preset abnormal voice detection model cannot detect an uncommon abnormal voice, and the preset voice detection model may miss detection of a common abnormal voice. According to the solution provided in this embodiment, the preset abnormal voice detection model is first used to detect a common abnormal voice, and then the machine learning model is used to detect the test voice, to determine whether the test voice has an unknown abnormal phenomenon, and/or, to determine whether the test voice has an abnormal phenomenon that is not detected by the non-machine learning model, thereby increasing probability of detecting an abnormal phenomenon of the test voice.

The embodiments of this application are further described in detail below based on common features of this application described above.

Figure 9:
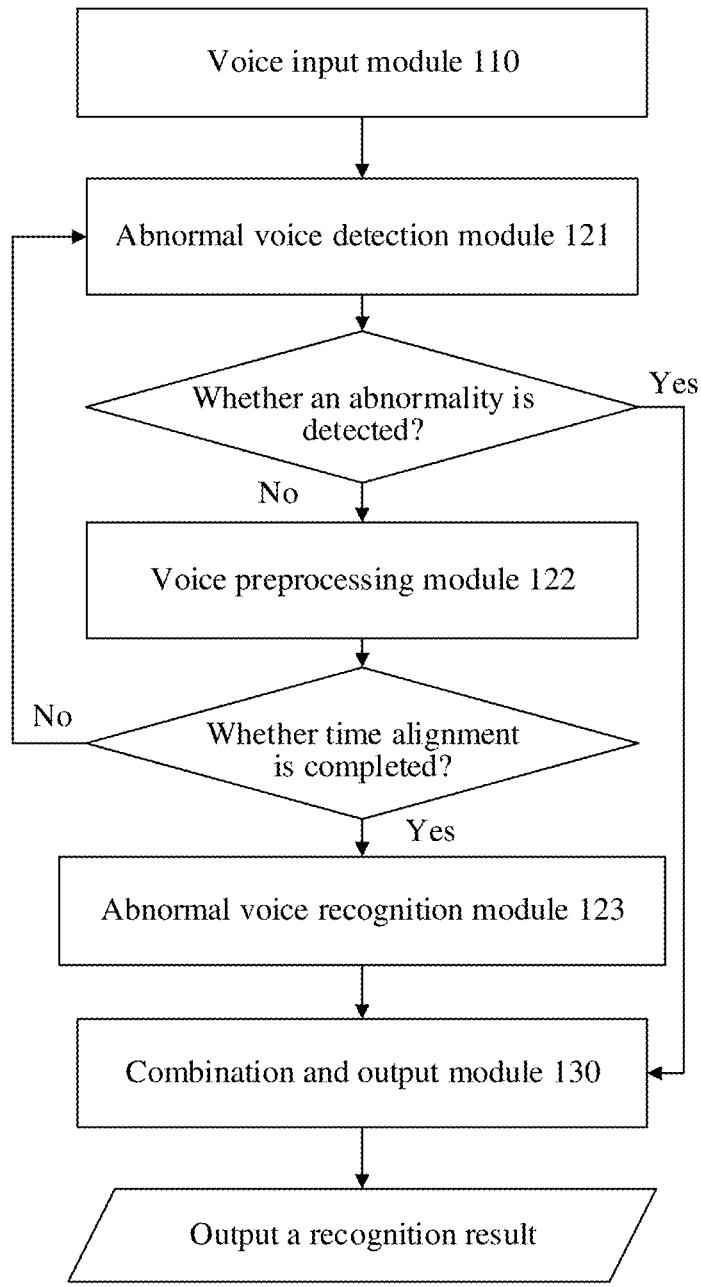
FIG. 9 is a schematic flowchart of an abnormal voice recognition method according to this application.

FIG. 9 is a schematic flowchart of an abnormal voice recognition method according to this application.

A pair of voices (an original voice and a test voice) input by a user is first converted by a voice input module 110, and then two converted voice segments (a converted original voice and a converted test voice) are transmitted to an abnormal voice detection module 121 that determines whether the test voice has an abnormality, such as a mute voice and low energy. If an abnormality is detected, a result that the abnormality is detected is transmitted to a combination and output module 130 as a final abnormality recognition result. If no abnormality is detected, the voice in which no abnormality is detected is sent to a voice preprocessing module 122.

After signal preprocessing and statement division, the voice input to the voice preprocessing module 122 is transmitted to the abnormal voice detection module 121. The abnormal voice detection module 121 determines, based on the two voice segments input for a second time, whether the test voice has an abnormality, such as a statement loss and discontinuity. If an abnormality is detected, a result that the abnormality is detected is transmitted to the combination and output module 130 as a final abnormality recognition result. If no abnormality is detected, the voice in which no abnormality is detected is transmitted to the voice preprocessing module 122. The voice preprocessing module 122 performs time alignment on the voices input for the second time, and sends the two aligned voice segments to an abnormal voice recognition module 123 for further abnormality recognition. Then, a recognition result is output to the combination and output module 130. Finally, the combination and output module 130 combines the result of the abnormal voice detection module 121 and the result of the abnormal voice recognition module 123, and uses a combined result as a final detection result of the voice.

Figure 10:
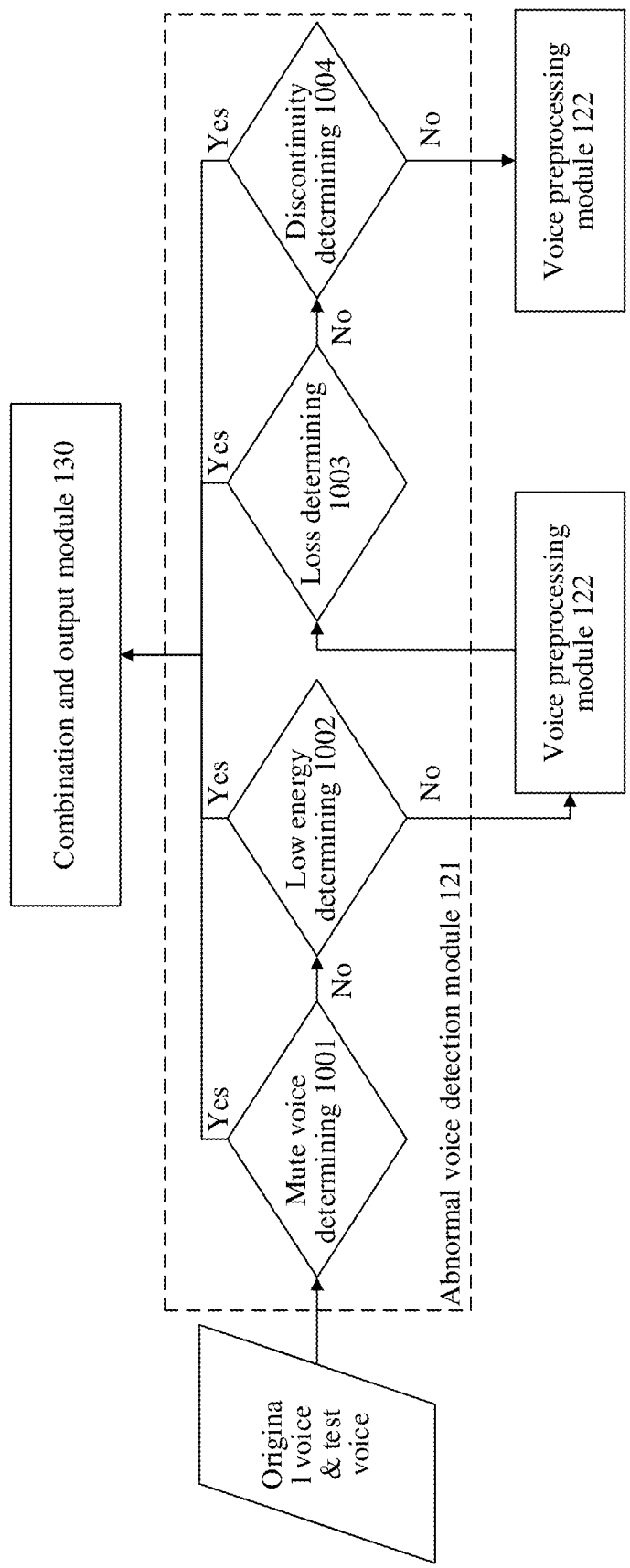
FIG. 10 is a schematic diagram of a working process of an abnormal voice detection module according to this application.

FIG. 10 shows a process of performing abnormality detection by the abnormal voice detection module 121. A method shown in FIG. 10 includes the following operations.

Mute voice determining 1001: Perform sliding window detection on two input voice segments respectively by using a VAD algorithm, and record an endpoint of each voice segment. If the algorithm detects no voice activity in a test voice but detects a voice activity in an original voice, the test voice has a mute voice abnormality, and the mute voice abnormality is transmitted to the combination and output module 130 as an abnormality detection result. Otherwise, low energy determining 1002 is performed.

Low energy determining 1002: If no mute voice abnormality is detected in the previous operation, separately calculate a loudness value of the original voice and test voice in this operation. A loudness loss (test voice loudness—original voice loudness) of the test voice in comparison with the original voice is input to a classifier A for determining a low energy abnormality. If a classification result of the classifier A is an abnormality, the test voice has a low energy abnormality, the low energy abnormality is transmitted to the combination and output module 130 as an abnormality detection result. Otherwise, this group of voices is transmitted to the voice preprocessing module 122.

Statement loss determining 1003: After completing signal preprocessing of statement division, the voice preprocessing module 122 transmits a processing result to the abnormal voice detection module 121, and the abnormal voice detection module 121 performs abnormality determining of a statement loss. After voice preprocessing, the two voice segments are divided into several statements based on voice activities, and a statement division result based on a silent period is obtained. A quantity ($Utt_{ref}$) of divided statements of the original voice is compared with a quantity ($Utt_{de}$) of divided statements of the test voice. If $Utt_{ref} \neq Utt_{de}$, the abnormal voice detection module 121 determines that the test statement has a content loss abnormality. If $Utt_{ref} = Utt_{de}$, but a ratio of a length of the test statement to a length of an original statement is less than 0.9, the abnormal voice detection module 121 also determines that the test statement has a content loss abnormality, and transmits the content loss abnormality to the combination output module 130 as an abnormality detection result. Otherwise, the abnormal voice detection module 121 performs discontinuity determining 1004.

Figure 11:
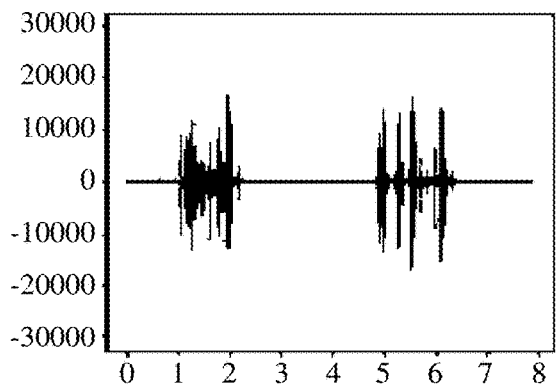
FIG. 11 is a schematic diagram of a content loss abnormality according to this application.
Figure 11:
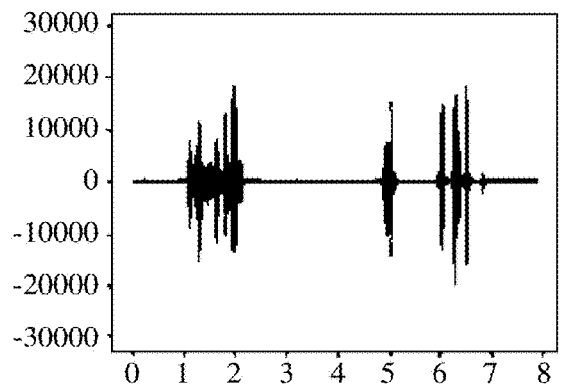
Figure 12:
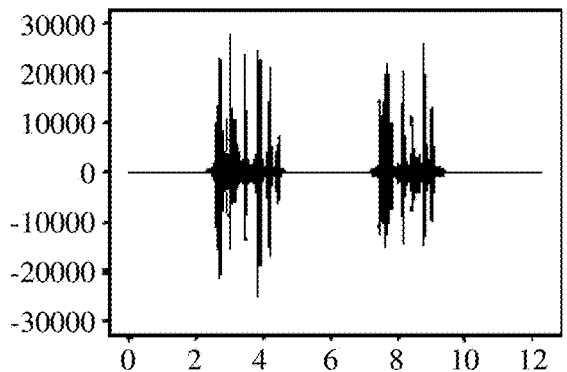
FIG. 12 is a schematic diagram of another content loss abnormality according to this application.
Figure 12:
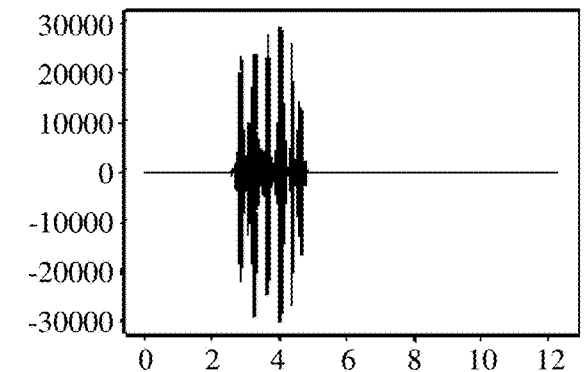
Figure 13:
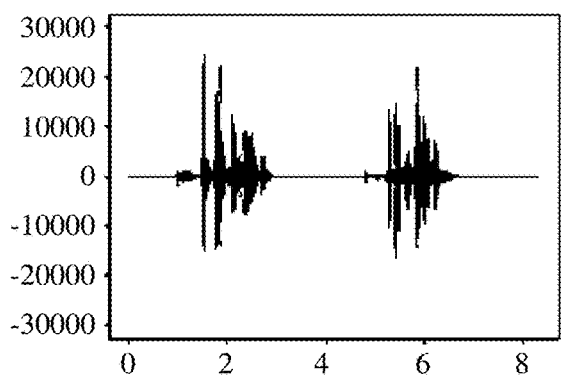
FIG. 13 is a schematic diagram of still another content loss abnormality according to this application.

FIG. 11 to FIG. 13 show examples of the abnormal content loss. In FIG. 11, because a relatively long period of content loss occurs in a second statement in the test voice, a situation of $Utt_{ref} < Utt_{de}$ occurs, where the original voice is on the left, the test voice is on the right, $Utt_{ref}=2$, and $Utt_{de}=3$. In FIG. 12, because the test voice loses a second statement in the original voice, a situation of $Utt_{ref} > Utt_{de}$ occurs, where the original voice is on the left, the test voice is on the right, $Utt_{ref}=2$, and $Utt_{de}=1$. In FIG. 13, because the test voice loses the beginning of the second statement, a length $l_{de}$ of the statement in the test voice is far less than a length $l_{ref}$ of the statement in the original voice, and $l_{ref}/l_{de} < 0.9$, where the original voice is on the left, the test voice is on the right, $Utt_{ref}=2$, and $Utt_{de}=2$.

Discontinuity determining 1004: If no abnormality is detected during the statement loss determining of the previous operation, whether the voice service has discontinuity is determined in this operation. Silent period duration in each statement in the original voice and test voice is respectively calculated by using the voice segment endpoint information recorded during statement division, and a silent period duration difference between the test statement and the original statement is input into the classifier B for discontinuity abnormality determining. If a classification result of the classifier B is an abnormality, the abnormal voice detection module 121 determines that the test voice has a discontinuity abnormality, and transmits the discontinuity abnormality to the combination and output module 130 as an abnormality detection result. Otherwise, this group of voices is transmitted to the voice preprocessing module 122 again.

Figure 14:
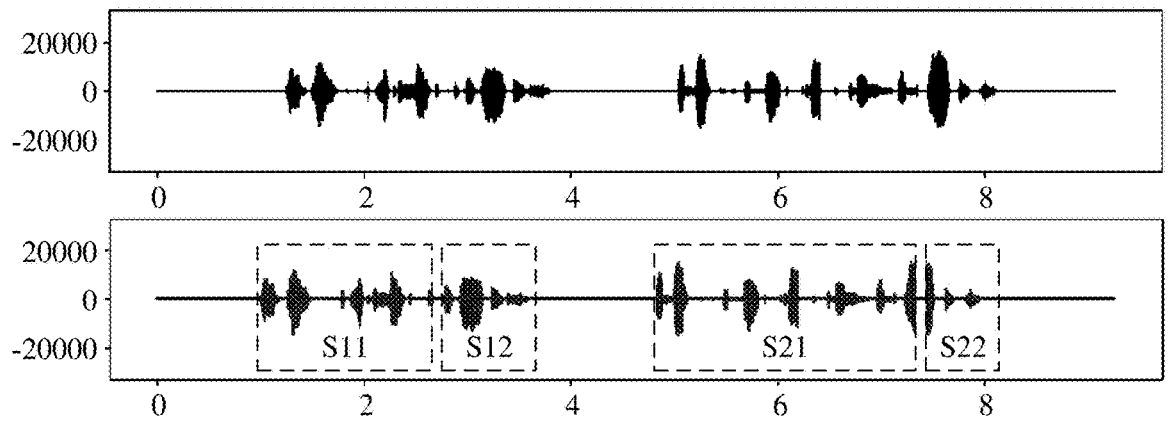
FIG. 14 is a schematic diagram of a discontinuity abnormality according to this application.

FIG. 14 is an example of determining a discontinuity abnormality based on a silent period. It is assumed that in a first statement of the test voice, a silent period length between voice segments S11 and S12 is $len_1$, and in a second statement, a silent period length between segments S21 and S22 is $len_2$. However, in a statement corresponding to the original voice, silent period lengths are $len_1'$ and $len_2'$ respectively. When $len_1 - len_1'$ and $len_2 - len_2'$ are separately input to the classifier B, because the classifier B detects that a difference between $len_2$ and $len_2'$ is abnormal, a discontinuity abnormality exists in the test voice.

The classifiers A and B used in the foregoing abnormality detection may be obtained based on a training dataset by using a machine learning method.

A training solution of the classifier A is as follows:

select all normal sample pairs and small energy abnormal sample pairs in the training dataset, to obtain a training sub-dataset used for training the classifier A;

calculate loudness differences between the sample pairs in the training sub-dataset (subtract an original voice loudness from a test voice loudness); and train the classifier A by using a standard training method and using each loudness difference and a sample label corresponding to each loudness difference, to obtain a classifier parameter.

A training solution of the classifier B is as follows:

select all normal sample pairs and discontinuity abnormality sample pairs in the training dataset, and input all the selected sample pairs into the voice preprocessing module in sequence to complete voice preprocessing of statement division, so as to obtain statement pairs in all the sample pairs;

mark all the statement pairs divided from the normal sample pairs as normal, and re-mark the statement pairs divided from the discontinuity abnormality sample pairs, where only a statement pair with a discontinuity case is marked as abnormal, and the statement pairs with other cases are marked as normal, to obtain a training sub-dataset used for training the classifier B;

calculate silent period duration differences between the statement pairs in the training sub-dataset (subtract a silent period length of the original statement from a silent period length of the test statement); and train the classifier B by using a standard training method and using each silent period duration difference and a label corresponding to each silent period duration difference, to obtain a classifier parameter.

The following describes in detail a working process of the voice preprocessing module 122.

Figure 15:
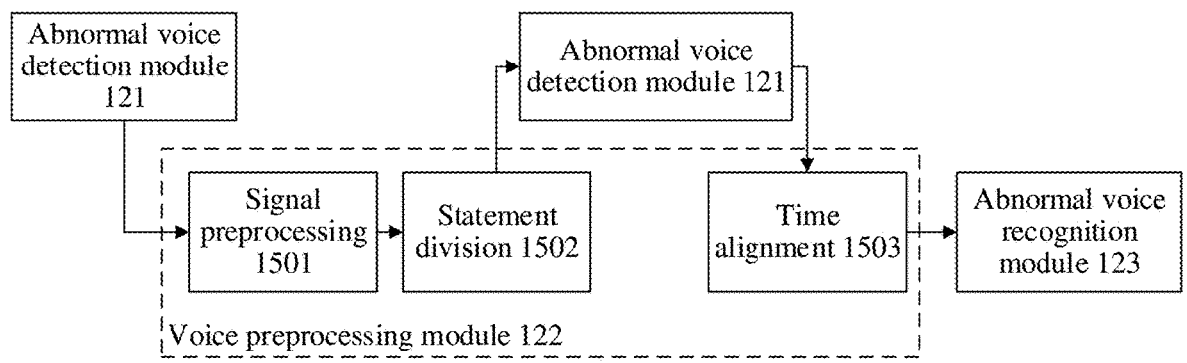
FIG. 15 is a schematic diagram of a working process of a voice preprocessing module according to this application.

FIG. 15 shows a schematic diagram of the working process of the voice preprocessing module 122 according to this application. The working process includes the following operations.

Signal preprocessing 1501: To reduce system gain differences between different voice systems and highlight frequency components that are important for auditory perception, the voice preprocessing module 122 adjusts levels of two voice segments to a standard auditory level, and performs filtering by using a band-pass filter.

Statement division 1502: Statement division is separately performed on the original voice and the test voice based on the voice segment endpoints that are recorded in the abnormal voice detection module during the mute voice determining, and statement division results are transmitted to the voice abnormality detection module 121. For an example of the statement division, refer to the method shown in FIG. 7.

Time alignment 1503: When the test voice and the original voice enter the voice preprocessing module again, it indicates that the test voice has passed the abnormality detection of statement loss and statement discontinuity, and no statement loss and statement discontinuity are detected in the test voice. Therefore, it can be determined that the statements in the test voice are in one-to-one correspondence to the statements in the original voice, and intra-statement alignment can be performed on the test statement.

Based on the method shown in FIG. 8, each statement of the test voice is divided into different test sub-statements. If $\tau_i$ is greater than 0, it indicates that a time domain location of a test sub-statement $x_i$ in the first test statement is after a time domain location of a corresponding voice segment in the first original statement, and a wave trough (a time length of the wave trough is equal to a value of $\tau_i$) is removed forwards by using a start location (a start time domain location) of $x_i$ as a start point. If $\tau_i$ is less than 0, it indicates that the time domain location of the test sub-statement $x_i$ in the first test statement is before the time domain location of the corresponding voice segment in the first original statement, and a silent period segment (a time length of the silent period segment is equal to an absolute value of $\tau_i$) is inserted backwards by using the start location (the start time domain location) of $x_i$ as a start point. If $\tau_i$ is equal to 0, it indicates that the time domain location of the test sub-statement $x_i$ in the first test statement is the same as the time domain location of the corresponding voice segment in the first original statement, and alignment is not needed.

After intra-statement alignment is performed on the first test statement, a first test statement on which intra-statement alignment is not performed in the test voice may be replaced by the first test statement on which intra-statement alignment is performed, and the first test statement and the first original statement are aligned based on the methods shown in FIG. 3 to FIG. 5.

Figure 16:
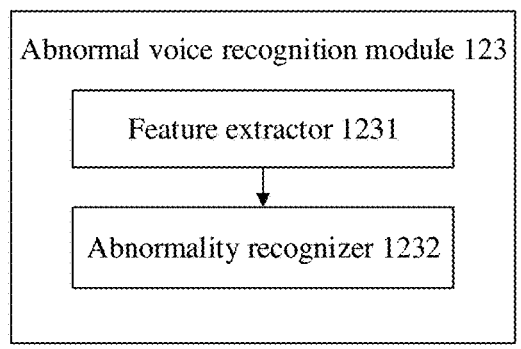
FIG. 16 is a schematic diagram of a structure of an abnormal voice recognition module according to this application.

FIG. 16 shows a schematic diagram of a structure of the abnormal voice recognition module 123 according to this application. The abnormal voice recognition module 123 performs abnormality detection on the original voice and the test voice based on a machine learning model. A process of performing abnormal voice detection by the abnormal voice recognition module 123 includes a training process and a detection process, where the training process is an optional process, and the abnormal voice recognition module 123 may perform the detection process by using a trained model.

The training process is as follows.

Feature extraction: To describe a difference between the test voice and the original voice, the abnormal voice recognition module 123 first extracts parameters of voice features on the two voice segments in a unit of frame. The voice features include but are not limited to voice features shown in Table 1. Then, the abnormal voice recognition module 123 calculates a difference between groups of feature parameters in the two voice segments, for example, a difference between a Mel-frequency cepstral coefficient (Mel-frequency cepstral coefficients, MFCC) of the original voice and an MFCC of the test voice. Finally, based on feature differences of whole voice segments (the original voice and the test voice), statistical features of each group of feature parameters of the whole voice segments are extracted by using a method including but not limited to statistical methods in Table 2, to obtain a difference feature with a fixed dimension between a pair of voices.

TABLE 1

| Feature parameters | Feature parameter values |
|---|---|
| Mel-frequency cepstral coefficients (MFCC) | A Hamming window with a frame length of 20 ms and a frame shift of 10 ms, 26 groups of filters, and extraction of first 13 dimensional frequency cepstral coefficients |
| First-order differences of the MFCC | A Hamming window with a frame length of 20 ms and a frame shift of 10 ms, 26 groups of filters, and extraction of first 13 dimensional frequency cepstral coefficients |
| Second-order differences of the MFCC | A Hamming window with a frame length of 20 ms and a frame shift of 10 ms, 26 groups of filters, and extraction of first 13 dimensional frequency cepstral coefficients |
| Linear predictive coefficients (LPC) | A frame length of 20 ms, a frame shift of 10 ms, and extraction of first 10 linear predictive coefficients of each frame |
| First-order differences of the LPC | A frame length of 20 ms, a frame shift of 10 ms, and extraction of first 10 linear predictive coefficients of each frame |
| Second-order differences of the LPC | A frame length of 20 ms, a frame shift of 10 ms, and extraction of first 10 linear predictive coefficients of each frame |
| Amplitude envelope | A frame length of 500 ms, and a frame shift of 10 ms |
| Envelope shape statistics | A frame length of 500 ms, and a frame shift of 10 ms |
| Loudness | A Hamming window with a frame length of 20 ms and a frame shift of 10 ms, extraction of energy of 24 frequency bands in the window, and standardization performed based on a total energy value |
| Energy | A frame length of 20 ms, and a frame shift of 10 ms |

TABLE 2

| Feature parameters | Feature descriptions | Calculation formulas |
|---|---|---|
| max | Maximum value | max (X) |
| min | Minimum value | min (X) |
| range | Value range | max − min |
| mean | Arithmetic mean (μ) | $\frac{1}{n}\sum_{i=1}^{n} X_i$ |
| maxmeandist | Distance between the maximum value and the mean | max − mean |
| minmeandist | Distance between the minimum value and the mean | min − mean |
| absmean | Absolute mean | $\frac{1}{n}\sum_{i=1}^{n} |X_i|$ |
| nzamean | Arithmetic mean of all non-zero entries | $\frac{1}{n}\sum_{i=1}^{n} X_i \; (X_i \neq 0)$ |
| nzabsmean | Absolute mean of all non-zero entries | $\frac{1}{n}\sum_{i=1}^{n} |X_i| \; (X_i \neq 0)$ |
| variance | Variance ($\sigma^2$) | $\sum_{i=1}^{n}(X_i - \overline{X})^2/n$ |
| stddev | Standard deviation (σ) | $\sqrt{\sum_{i=1}^{n}(X_i - \overline{X})^2/n}$ |
| rms | Root mean square (valid value) | $\sqrt{\sum_{i=1}^{n} X_i^2/n}$ |
| skewness | Skewness, indicating a direction of deflection and a degree of distribution of statistical data values | $\dfrac{EX^3 - 3\mu\sigma^2 - \mu^3}{\sigma^3}$ |
| kurtosis | Kurtosis, indicating peak sharpness of distribution of statistical data values | $\dfrac{\frac{1}{n}\sum_{i=1}^{n}(X_i - \overline{X})^4}{\sigma^4}$ |
| quartiles1 | First quartile, a "smaller quartile", Q1 | Top 25% of digits after all digital numbers are arranged in an ascending order |

TABLE 2-continued

| Feature parameters | Feature descriptions | Calculation formulas |
| --- | --- | --- |
| quartiles2 | Second quartile, a "median", Q2 | Top 50% of digits after all digital numbers are arranged in an ascending order |
| quartiles3 | Third quartile, a "larger quartile", Q3 | Top 75% of digits after all digital numbers are arranged in an ascending order |
| iqr12 | Interquartile range, describing dispersion of statistical data | Q1 − Q2 |
| iqr23 | Interquartile range, describing dispersion of statistical data | Q2 − Q3 |
| iqr13 | Interquartile range, describing dispersion of statistical data | Q1 − Q3 |

Abnormality recognition: A machine learning model (such as a random forest and a deep neural network) is used to learn a condition in which the test voice is an abnormal voice and a specific abnormal voice type to which the test voice belongs. The abnormal voice type includes but is not limited to mute voice, low energy, discontinuity, noise, and low quality, and can be subdivided into more specific types, such as mute voice, low energy, discontinuity, metal noise, garbled noise, content loss, echo, and distortion.

Figure 17:
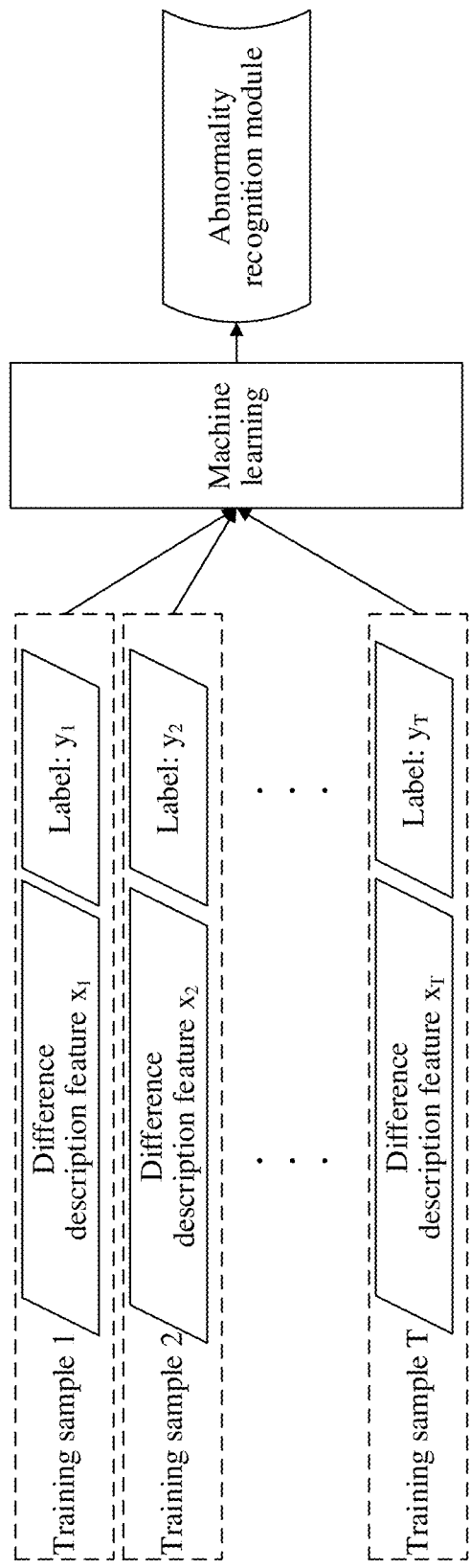
FIG. 17 is a schematic diagram of a training process based on a machine learning model according to this application.

A training process based on the machine learning model is shown in FIG. 17. After feature extraction is completed for T training samples, all obtained difference description features and abnormality labels (an abnormality-free type or a specific abnormality type) corresponding to the difference description features are input into the machine learning model with a plurality of classes together, to obtain an abnormality recognition module after learning. The abnormality recognition module mainly includes a mapping relationship between a difference description feature x and a label y.

Figure 18:
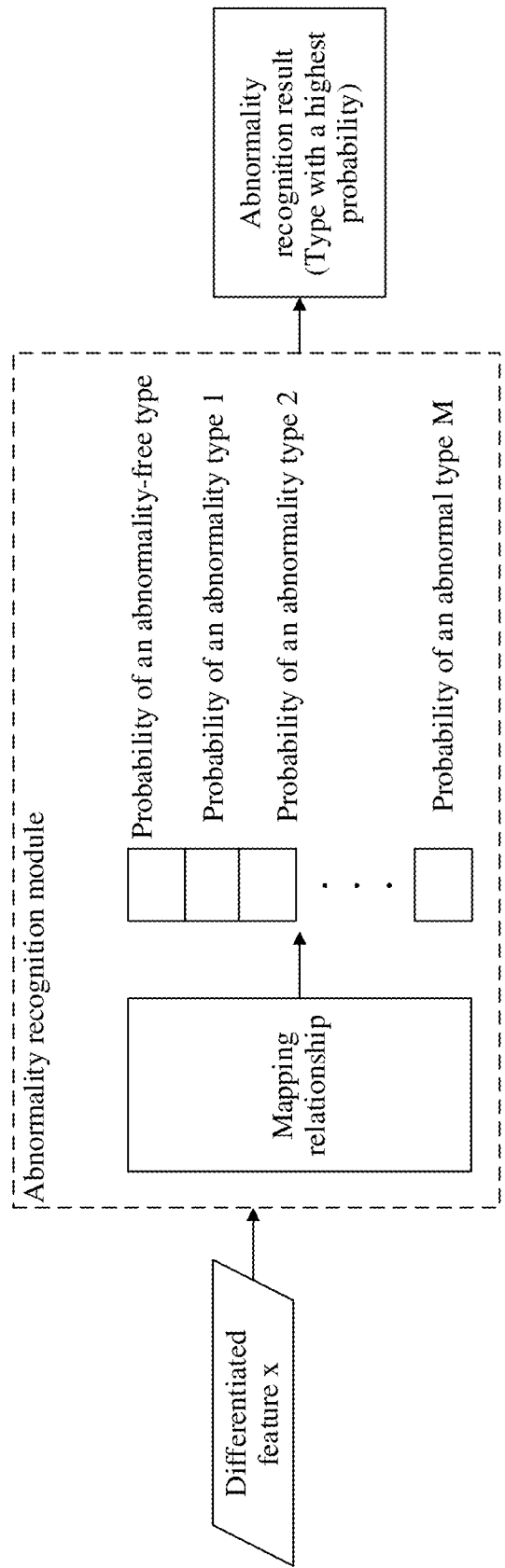
FIG. 18 is a schematic diagram of a detection process based on a machine learning model according to this application.

A detection process based on the machine learning model is shown in FIG. 18.

A pair of voices is first input to extract difference features of the voices.

Probabilities (or scores) that the pairs of voices belong to various types of abnormalities are calculated based on the machine learning model, where the machine learning model includes correspondences between the various types of abnormalities and the difference features.

The abnormality type with the highest probability (or score) is considered as an abnormality classification result. If values of the probabilities of the various types of abnormalities do not meet a preset condition, it may be considered that a test voice in this pair of voices is a normal voice.

Figure 19:
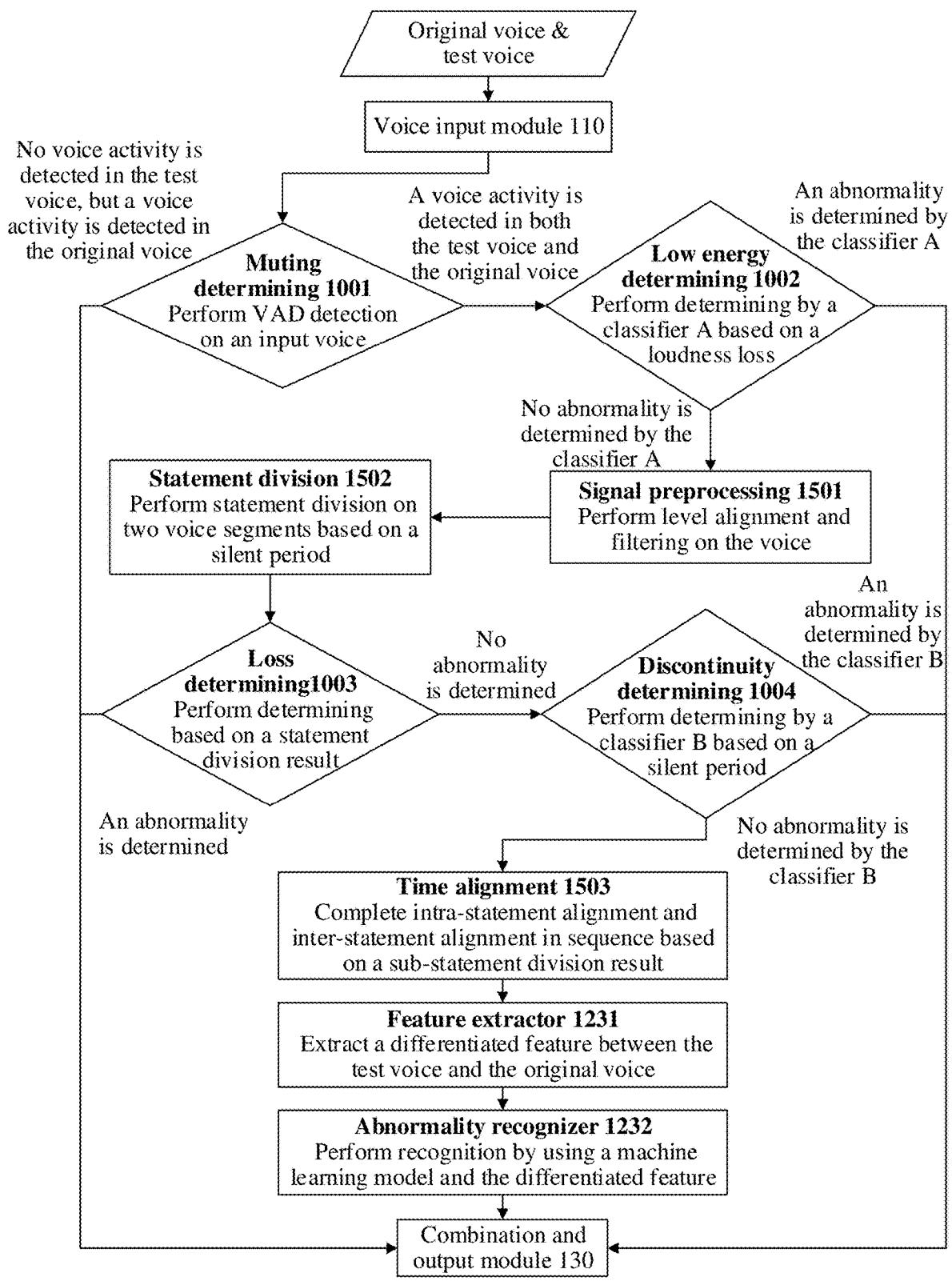
FIG. 19 is a schematic flowchart of another abnormal voice recognition method according to this application.

FIG. 19 is a schematic flowchart of another abnormal voice recognition method according to this application.

Figure 20:
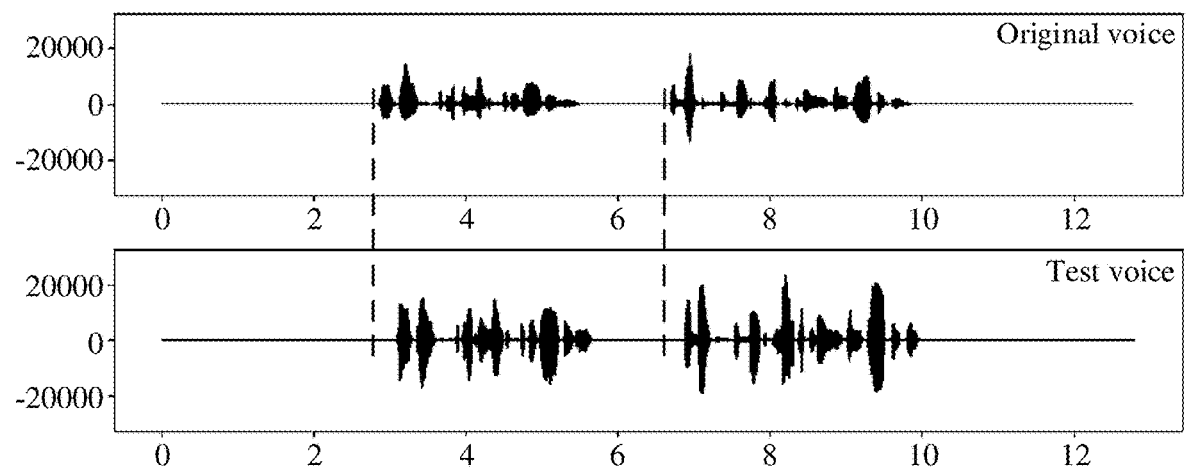
FIG. 20 is a schematic diagram of a to-be-detected voice according to this application.
Figure 21:
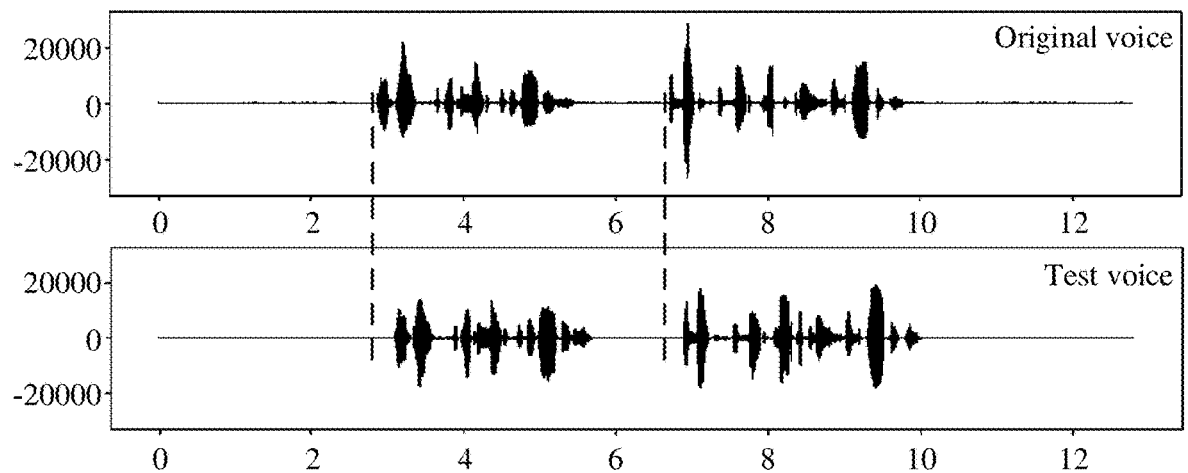
FIG. 21 is a schematic diagram of a statement division result according to this application.

A pair of to-be-tested voices (both at a sampling rate of 8 K) shown in FIG. 20 is first input, and then a first part of detections of the abnormal voice detection module 121 is performed, to be specific, mute voice determining 1001 and low energy determining 1002 are performed, to eliminate possible mute voice abnormalities and low energy abnormalities in the test voice. Subsequently, the voice preprocessing module 122 is used to perform signal preprocessing 1501 and statement division 1502, to obtain a result shown in FIG. 21. Table 3 shows a statement division result.

TABLE 3

| Original voice | Test voice |
| --- | --- |
| Segment 1: 2.84 s to 5.79 s | Segment 1: 3.09 s to 6.01 s |
| Segment 2: 6.68 s to 10.12 s | Segment 2: 6.87 s to 10.34 s |

The test voice and the original voice are input to the abnormal voice detection module 121 again to perform a second part of abnormality detections. To be specific, the abnormal voice detection module 121 performs loss determining 1003 and discontinuity determining 1004. Based on the statement division result, $Utt_{ref}$ and $Utt_{de}$ are both 2, and $l_{ref}/l_{de} > 0.9$. A silent period is not detected in the two statements of the test voice, and a possible content loss and possible discontinuity in the test voice are excluded. Then, the abnormal voice detection module 121 transmits the test voice and the original voice to the voice preprocessing module 122 for further processing.

Figure 22:
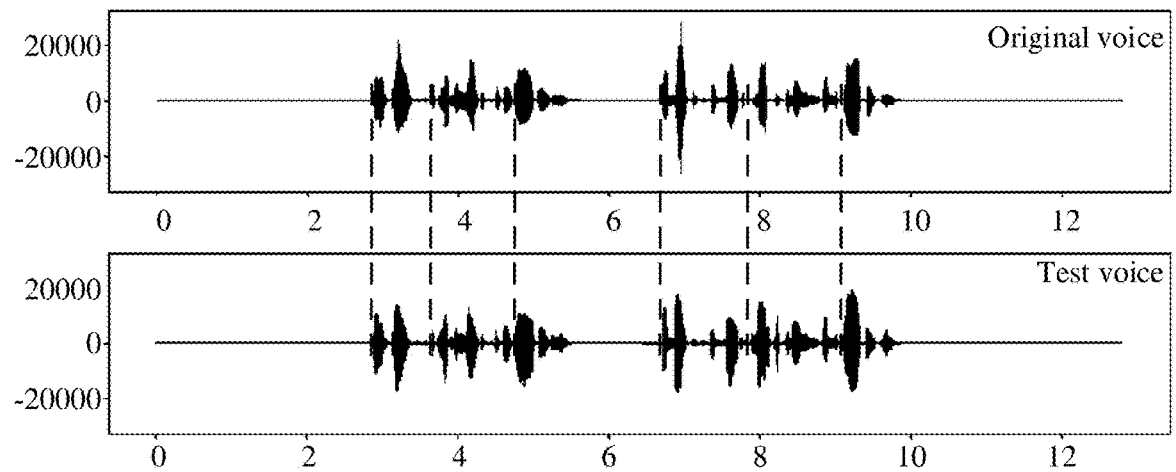
FIG. 22 is a schematic diagram of a statement alignment result according to this application.

After being detected by the abnormal voice detection module 121, the test voice has no content loss and discontinuity. The voice preprocessing module 122 performs sub-statement division, sub-statement delay calculation, and intra-statement alignment on each test statement in sequence, and uses aligned test statements to complete inter-statement alignment. An alignment result is shown in FIG. 22.

A feature extractor 1231 extracts difference features between the test voice and the original voice, and an abnormality recognizer 1232 classifies the difference features. In the preceding example, the test voice is recognized as an abnormal voice with garbled noise, and the abnormality recognizer 1232 transmits the result to the combination and output module 130.

The combination and output module 130 displays an output result of the abnormal voice recognition module 123 as a final output to a user:

"This test voice is an abnormal voice and has a noise (garbled noise) problem."

In this embodiment, the test voice has an obvious delay problem compared with the original voice, where doped noise has an unobvious impact on waveform. Therefore, an abnormality is not recognized in an operation of performing detection based on a non-machine learning model, and through time alignment 1503, statements and sub-statements in the test voice can be quickly aligned with segments in the original voice. In this case, an abnormality detection model based on the machine learning model detects an abnormality of the test voice, thereby improving efficiency of abnormality detection.

Based on the process shown in FIG. 19, another example is described as follows.

Figure 23:
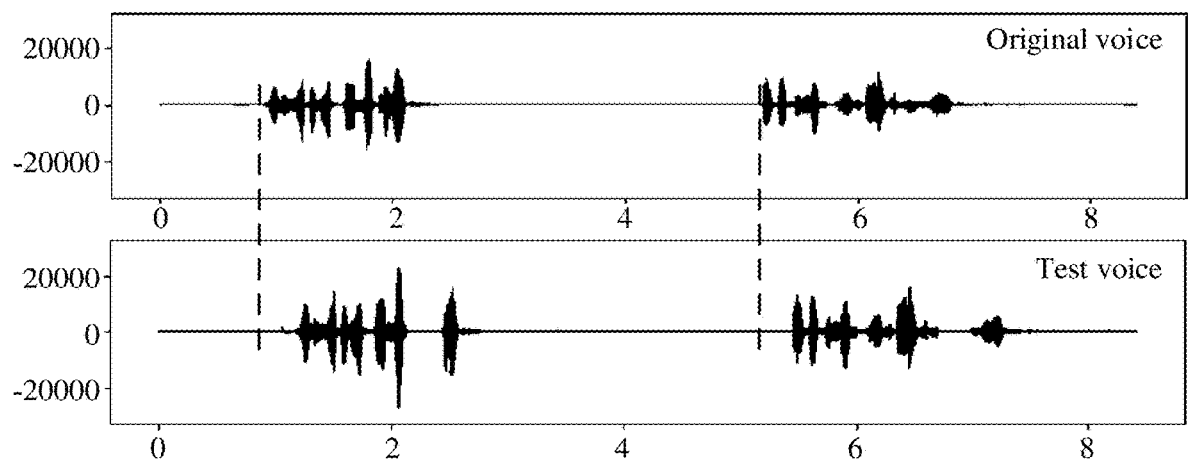
FIG. 23 is a schematic diagram of another to-be-detected voice according to this application.

A pair of to-be-tested voices (both with a sampling rate of 8 K) shown in FIG. 23 is first input, and then the first part of detections of the abnormal voice detection module 121 is performed, to be specific, mute voice determining 1001 and low energy determining 1002 are performed, to eliminate possible mute voice abnormalities and low energy abnormalities in the test voice. Subsequently, the voice preprocessing module 122 is used to perform signal preprocessing 1501 and statement division 1502.

The test voice and the original voice are input to the abnormal voice detection module 121 again to perform the second part of abnormality detections. To be specific, the abnormal voice detection module 121 performs loss determining 1003 and discontinuity determining 1004. Based on a statement division result, if $Utt_{ref}$ and $Utt_{de}$ are equal, and $l_{ref}/l_{de}$>0.9, it is determined that a possible content loss in the test voice is excluded. If a silent period duration difference between the test voice and the original voice is greater than a preset discontinuity threshold $T_d$, it is considered that a discontinuity abnormality exists in the test voice, and an abnormality result is directly transmitted to the combination and output module 130 for further processing.

The combination and output module 130 displays an output result of the abnormal voice detection module 121 as a final output to the user:

"This test voice is an abnormal voice and has discontinuity."

In this embodiment, discontinuity exists in the test voice, and in a detection method based on the non-machine learning model, an abnormality can be detected without training, thereby improving efficiency of voice abnormality detection. The foregoing embodiment is merely an example for description. The combination and output module 130 may also cache the detection result of the abnormal voice detection module 121, wait for the detection result of the abnormal voice recognition module 123, and combine and output the detection results of the two modules, so that an abnormal phenomenon existing in the test voice can be more comprehensively detected.

The foregoing describes in detail an example of the voice alignment method provided in this application. It may be understood that, the voice alignment apparatus includes a corresponding hardware structure and/or software module for performing each function, to implement the foregoing functions. A person skilled in the art should easily be aware that, in combination with the examples described in the embodiments disclosed in this specification, units and algorithm operations can be implemented by hardware or a combination of hardware and computer software in this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In this application, functional units of the voice alignment apparatus may be divided based on the foregoing method examples. For example, the functional units may be divided based on functions corresponding to the manners shown in FIG. 2, or two or more functions may be integrated into one processing unit. The integrated unit may be implemented in a form of hardware, or may be implemented in a form of a software functional unit. It should be noted that, in this application, unit division is exemplary, and is merely a logical function division. In other embodiments, another division manner may be used.

Figure 24:
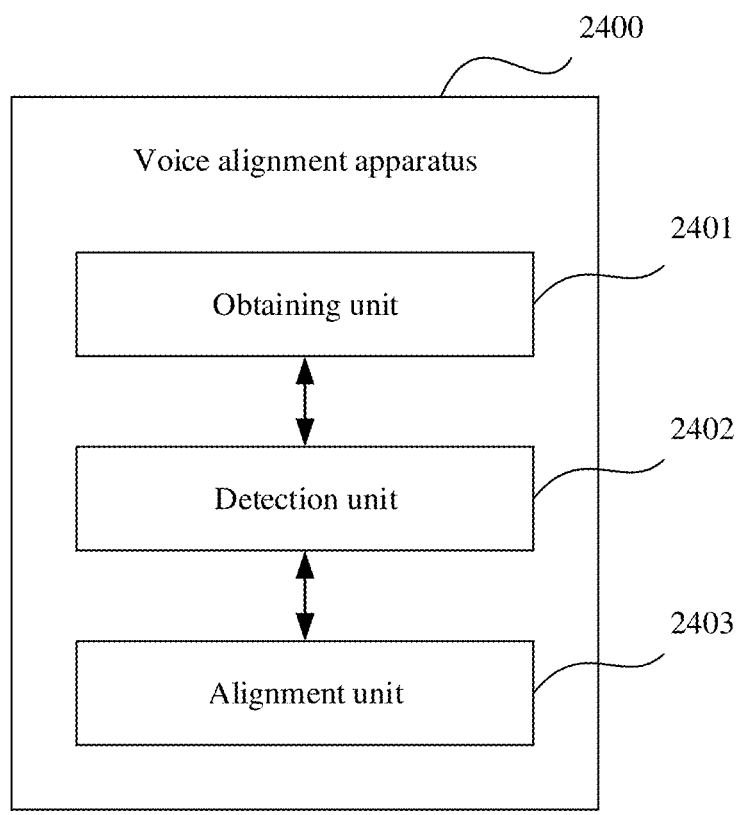
FIG. 24 is a schematic diagram of a structure of a voice alignment apparatus according to this application.

In a case that an integrated unit is used, FIG. 24 is a schematic diagram of a possible structure of the voice alignment apparatus described in the foregoing embodiments. The voice alignment apparatus 2400 includes: an obtaining unit 2401, a detection unit 2402, and an alignment unit 2403. The detection unit 2402 and the alignment unit 2403 are configured to support the voice alignment apparatus 2400 to perform the detection and alignment operations shown in FIG. 2. The obtaining unit 2401 is configured to obtain an original voice and a test voice. The obtaining unit 2401, the detection unit 2402, and the alignment unit 2403 may be further configured to perform other processes of the technology described in this specification. The voice alignment apparatus 2400 may further include a storage unit, configured to store program code and data of the voice alignment apparatus 2400.

The obtaining unit 2401 is configured to obtain an original voice and a test voice, where the test voice is a voice generated after the original voice is transmitted over a communications network.

The detection unit 2402 is configured to perform loss detection and/or discontinuity detection on the test voice obtained by the obtaining unit 2401, where the loss detection is used to determine whether the test voice has a voice loss compared with the original voice, and the discontinuity detection is used to determine whether the test voice has voice discontinuity compared with the original voice.

The alignment unit 2403 is configured to align the test voice with the original voice based on a result of the loss detection and/or the discontinuity detection performed by the detection unit 2402, to obtain an aligned test voice and an aligned original voice, where the result of the loss detection and/or the discontinuity detection is used to indicate a manner of aligning the test voice with the original voice.

The detection unit 2402 and the alignment unit 2403 may be components of a processing unit, and the processing unit may be a processor or a controller, for example, may be a central processing unit (CPU), a general-purpose processor, a digital signal processor (DSP), an application-specific integrated circuit (ASIC), a field programmable gate array (FPGA) or another programmable logic device, a transistor logic device, a hardware component, or any combination thereof. The processor may implement or execute various example logical blocks, modules, and circuits described with reference to content disclosed in this application. Alternatively, the processor may be a combination of processors implementing a computing function, for example, a combination of one or more microprocessors, or a combination of a DSP and a microprocessor. The obtaining unit 2401 may be a transceiver or a communications interface. The storage unit may be a memory.

Figure 25:
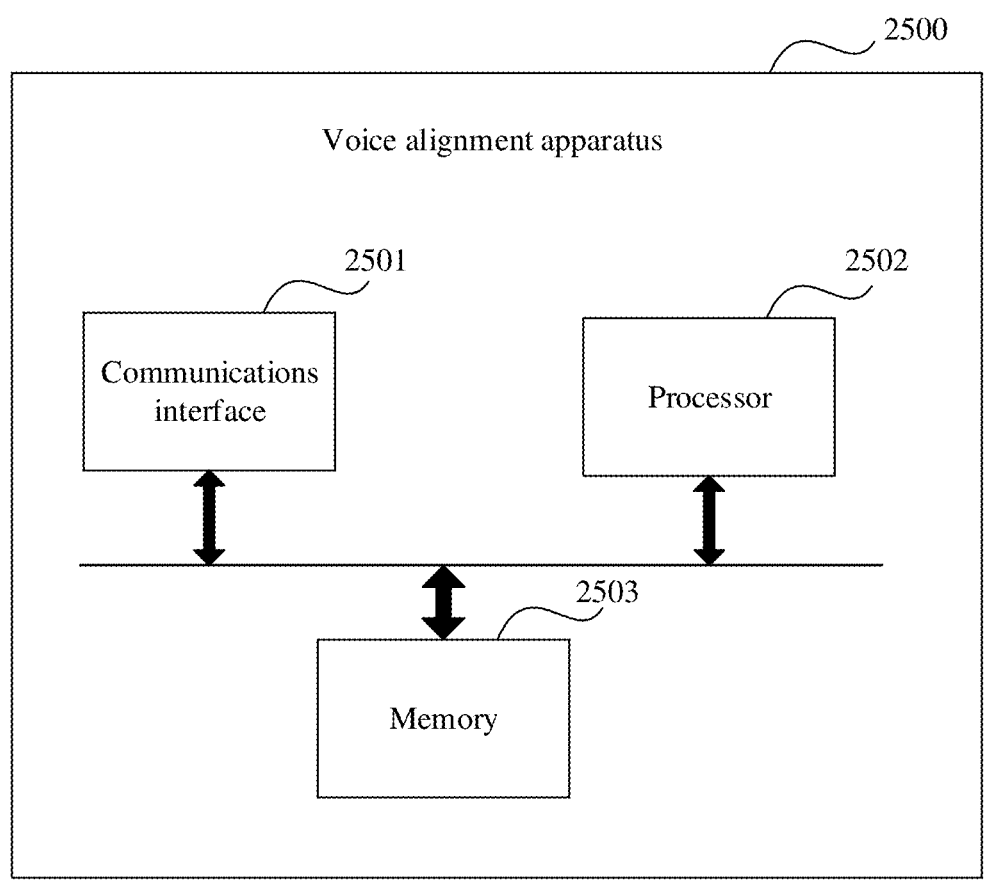
FIG. 25 is a schematic diagram of a structure of another voice alignment apparatus according to this application.

When the processing unit is a processor, the obtaining unit 2401 is a communications interface, and the storage unit is a memory, the voice alignment apparatus described in this application may be an apparatus shown in FIG. 25.

Referring to FIG. 25, the apparatus 2500 includes: a processor 2502, a communications interface 2501, and a memory 2503. The communications interface 2501, the processor 2502, and the memory 2503 may communicate with each other by using an intra-connection channel, to transmit a control signal and/or a data signal.

It may be clearly understood by a person skilled in the art that, for the purpose of convenient and brief description, for a detailed working process of the foregoing apparatus and units, refer to a corresponding process in the foregoing method embodiments, and details are not described herein again.

According to the voice alignment apparatus 2400 and the voice alignment apparatus 2500 provided in this application, the voice alignment method is determined based on the result of the loss detection and/or the discontinuity detection, and voice alignment may be performed based on a specific status of the test voice by using a most suitable method, thereby improving efficiency of the voice alignment.

The apparatus embodiments completely correspond to the method embodiments, and corresponding modules perform corresponding operations. For example, the obtaining unit performs the obtaining operation in the method embodiment, and other operations except the obtaining operation may be performed by the processing unit or the processor. For a function of a specific unit, refer to a corresponding method embodiment. Details are not described herein again.

In the embodiments of this application, the sequence numbers of the processes do not mean execution sequences. The execution sequences of the processes should be determined based on functions and internal logic of the processes, and should not be construed as any limitation on the implementation processes of this application.

In addition, the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

Methods or algorithm operations described with reference to content disclosed in this application may be implemented by hardware, or may be implemented by a processor executing a software instruction. The software instruction may include a corresponding software module. The software module may be stored in a random access memory (RAM), a flash memory, a read-only memory (ROM), an erasable programmable read-only memory (EPROM), an electrically erasable programmable read-only memory (EEPROM), a register, a hard disk, a removable hard disk, a compact disc read-only memory (CD-ROM), or any other form of storage medium well-known in the art. For example, a storage medium is coupled to a processor, so that the processor can read information from the storage medium and write information into the storage medium. Certainly, the storage medium may alternatively be a component of the processor. The processor and the storage medium may be located in an ASIC. In addition, the ASIC may be located in the voice alignment apparatus. Certainly, the processor and the storage medium may exist in the voice alignment apparatus as discrete components.

All or some of the foregoing embodiments may be implemented by using software, hardware, firmware, or any combination thereof. When software is used to implement the embodiments, all or some of the foregoing embodiments may be implemented in a form of a computer program product. The computer program product includes one or more computer instructions. When the computer program instructions are loaded and executed on a computer, all or some of the procedures or functions according to this application are generated. The computer may be a general-purpose computer, a special-purpose computer, a computer network, or another programmable apparatus. The computer instructions may be stored in a computer-readable storage medium, or transmitted by using the computer-readable storage medium. The computer instructions may be transmitted from a website, computer, server, or data center to another website, computer, server, or data center in a wired (for example, a coaxial cable, an optical fiber, or a digital subscriber line (DSL)) manner or a wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD), a semiconductor medium (for example, a solid-state drive (SSD)), or the like.

The objectives, technical solutions, and benefits of this application are further described in detail in the foregoing specific embodiments. It should be understood that the foregoing descriptions are merely specific embodiments of this application, but are not intended to limit the protection scope of this application. Any modification, equivalent replacement, improvement, or the like made based on the technical solutions of this application shall fall within the protection scope of this application.

What is claimed is:

1. A voice alignment method, comprising:
    obtaining an original voice and a test voice, wherein:
        the original voice comprises a first original statement, and
        the test voice is a voice generated after the original voice is transmitted over a communications network, the test voice comprises a first test statement, and the first original statement corresponds to the first test statement;
    performing loss detection or discontinuity detection on the test voice, wherein the loss detection is used to determine whether the test voice has a voice loss compared with the original voice, and the discontinuity detection is used to determine whether the test voice has voice discontinuity compared with the original voice; and
    aligning the test voice with the original voice based on a result of the loss detection or the discontinuity detection, to obtain an aligned test voice and an aligned original voice, wherein the result of the loss detection or the discontinuity detection is used to indicate a manner of aligning the test voice with the original voice, the aligning comprising:
        inserting a first silent statement before a start time domain location of the first test statement when the test voice has no voice loss or voice discontinuity, and the start time domain location of the first test statement is before a start time domain location of the first original statement, wherein duration of the first silent statement is equal to a time difference between the start time domain location of the first test statement and the start time domain location of the first original statement; or
        deleting a second silent statement before a start time domain location of the first test statement when the test voice has no voice loss or voice discontinuity, and the start time domain location of the first test statement is after a start time domain location of the first original statement, wherein duration of the second silent statement is equal to a time difference between the start time domain location of the first test statement and the start time domain location of the first original statement.

2. The method according to claim 1, wherein before the inserting a first silent statement before a start time domain location of the first test statement, or before the deleting a second silent statement before a start time domain location of the first test statement, the aligning the test voice with the original voice based on the result of the loss detection or the discontinuity detection further comprises:
    determining at least two original statements based on a silent period in the original voice, wherein the at least two original statements comprise the first original statement, and the silent period in the original voice is used to indicate locations at which the at least two original statements are divided; and determining at least two test statements based on a silent period in the test voice, wherein the at least two test statements comprise the first test statement, and the silent period in the test voice is used to indicate locations at which the at least two test statements are divided.

3. The method according to claim 1, wherein before the inserting a first silent statement before a start time domain location of the first test statement, or before the deleting a second silent statement before a start time domain location of the first test statement, the aligning the test voice with the original voice based on the result of the loss detection or the discontinuity detection further comprises:
determining a first test sub-statement and a second test sub-statement based on a wave trough of the first test statement, wherein the wave trough is a voice fragment whose amplitude average value of frames is less than or equal to an amplitude threshold in the first test statement, and the wave trough is used to indicate division locations of the first test sub-statement and the second test sub-statement;
determining a first original sub-statement based on a cross-correlation coefficient and the first test sub-statement, wherein the cross-correlation coefficient is used to indicate a similarity between a voice segment of the first original statement and the first test sub-statement, and the first original sub-statement is a voice segment that is in voice segments of the first original statement and that has a highest similarity to the first test sub-statement; and
aligning the first test sub-statement with the first original sub-statement based on a time offset of a first time domain location relative to a second time domain location and by using a time domain location of the first original sub-statement as a reference location, wherein the first time domain location is a time domain location of the first test sub-statement in the first test statement, and the second time domain location is a time domain location of the first original sub-statement in the first original statement.

4. The method according to claim 3, wherein the aligning the first test sub-statement with the first original sub-statement based on a time offset of a first time domain location relative to a second time domain location and by using a time domain location of the first original sub-statement as a reference location comprises:
when the time offset is less than or equal to a delay threshold, aligning the first test sub-statement with the first original sub-statement based on the time offset of the first time domain location relative to the second time domain location and by using the time domain location of the first original sub-statement as the reference location.

5. The method according to claim 1, wherein the aligning the test voice with the original voice based on the result of the loss detection the discontinuity detection further comprises:
adding a third silent statement after an end time domain location of the test voice when the end time domain location of the test voice is before an end time domain location of the original voice, wherein duration of the third silent statement is equal to a time difference between the end time domain location of the test voice and the end time domain location of the original voice; or
deleting a fourth silent statement after an end time domain location of the test voice when the end time domain location of the test voice is after an end time domain location of the original voice, wherein duration of the fourth silent statement is equal to a time difference between the end time domain location of the test voice and the end time domain location of the original voice.

6. The method according to claim 1, wherein
before the aligning the test voice with the original voice based on the result of the loss detection or the discontinuity detection, the method further comprises:
detecting the test voice based on a preset abnormal voice detection model, to determine whether the test voice is an abnormal voice, wherein the preset abnormal voice detection model is a non-machine learning model, content detected by the non-machine learning model is different from content detected by the loss detection, or content detected by the non-machine learning model is different from content detected by the discontinuity detection.

7. The method according to claim 1, further comprising:
detecting the aligned test voice based on a machine learning model and the aligned original voice, to determine whether the aligned test voice is an abnormal voice, or determine an abnormal type of the aligned test voice.

8. A voice alignment apparatus, comprising:
at least one processor; and
a non-transitory computer-readable storage medium coupled to the at least one processor and storing programming instructions, which when executed by the at least one processor, cause the at least one processor to perform operations, the operations comprising:
obtaining an original voice and a test voice, wherein:
the original voice comprises a first original statement, and
the test voice is a voice generated after the original voice is transmitted over a communications network, the test voice comprises a first test statement, and the first original statement corresponds to the first test statement;
performing loss detection or discontinuity detection on the test voice, wherein the loss detection is used to determine whether the test voice has a voice loss compared with the original voice, and the discontinuity detection is used to determine whether the test voice has voice discontinuity compared with the original voice;
aligning the test voice with the original voice based on a result of the loss detection or the discontinuity detection, to obtain an aligned test voice and an aligned original voice, wherein the result of the loss detection or the discontinuity detection is used to indicate a manner of aligning the test voice with the original voice; and
at least one of:
inserting a first silent statement before a start time domain location of the first test statement when the test voice has no voice loss or voice discontinuity, and the start time domain location of the first test statement is before a start time domain location of the first original statement, wherein duration of the first silent statement is equal to a time difference between the start time domain location of the first test statement and the start time domain location of the first original statement; and
deleting a second silent statement before a start time domain location of the first test statement when the test voice has no voice loss or voice discontinuity, and the start time Adomain location of the first test statement is after a start time domain location of the first original statement, wherein duration of the second silent statement is equal to a time difference between the start time domain location of the first test statement and the start time domain location of the first original statement.

9. The apparatus according to claim 8, wherein, before inserting the first silent statement before the start time domain location of the first test statement, or before deleting the second silent statement before the start time domain location of the first test statement, the operations further comprise:
determining at least two original statements based on a silent period in the original voice, wherein the at least two original statements comprise the first original statement, and the silent period in the original voice is used to indicate locations at which the at least two original statements are divided; and
determining at least two test statements based on a silent period in the test voice, wherein the at least two test statements comprise the first test statement, and the silent period in the test voice is used to indicate locations at which the at least two test statements are divided.

10. The apparatus according to claim 8, wherein, before inserting the first silent statement before the start time domain location of the first test statement, or before deleting the second silent statement before the start time domain location of the first test statement, the operations further comprise:
determining a first test sub-statement and a second test sub-statement based on a wave trough of the first test statement, wherein the wave trough is a voice fragment whose amplitude average value of frames is less than or equal to an amplitude threshold in the first test statement, and the wave trough is used to indicate locations at which the first test sub-statement and the second test sub-statement are divided;
determining a first original sub-statement based on a cross-correlation coefficient and the first test sub-statement, wherein the cross-correlation coefficient is used to indicate a similarity between a voice segment of the first original statement and the first test sub-statement, and the first original sub-statement is a voice segment that is in voice segments of the first original statement and that has a highest similarity to the first test sub-statement; and
aligning the first test sub-statement with the first original sub-statement based on a time offset of a first time domain location relative to a second time domain location and by using a time domain location of the first original sub-statement as a reference location, wherein the first time domain location is a time domain location of the first test sub-statement in the first test statement, and the second time domain location is a time domain location of the first original sub-statement in the first original statement.

11. The apparatus according to claim 10, wherein the operations further comprise:
when the time offset is less than or equal to a delay threshold, aligning the first test sub-statement with the first original sub-statement based on the time offset of the first time domain location relative to the second time domain location and by using the time domain location of the first original sub-statement as the reference location.

12. The apparatus according to claim 8, wherein the operations further comprise:
adding a third silent statement after an end time domain location of the test voice when the end time domain location of the test voice is before an end time domain location of the original voice, wherein duration of the third silent statement is equal to a time difference between the end time domain location of the test voice and the end time domain location of the original voice; or
deleting a fourth silent statement after an end time domain location of the test voice when the end time domain location of the test voice is after an end time domain location of the original voice, wherein duration of the fourth silent statement is equal to a time difference between the end time domain location of the test voice and the end time domain location of the original voice.

13. The apparatus according to claim 8, wherein
before aligning the test voice with the original voice based on the result of the loss detection or the discontinuity detection, the operations further comprise:
detecting the original voice and the test voice based on a preset abnormal voice detection model, to determine whether the test voice is an abnormal voice, wherein the preset abnormal voice detection model is a non-machine learning model, content detected by the non-machine learning model is different from content detected by the loss detection, or content detected by the non-machine learning model is different from content detected by the discontinuity detection.

14. The apparatus according to claim 8, wherein the operations further comprise:
detecting the aligned test voice based on a machine learning model and the aligned original voice, to determine whether the aligned test voice is an abnormal voice, or determine an abnormal type of the aligned test voice.

15. A non-transitory computer-readable storage medium storing computer program code, which when run on a computer, causes the computer to perform operations comprising:
obtaining an original voice and a test voice, wherein:
the original voice comprises a first original statement, the test voice is a voice generated after the original voice is transmitted over a communications network, the test voice comprises a first test statement, and the first original statement corresponds to the first test statement;
performing loss detection or discontinuity detection on the test voice, wherein the loss detection is used to determine whether the test voice has a voice loss compared with the original voice, and the discontinuity detection is used to determine whether the test voice has voice discontinuity compared with the original voice;
aligning the test voice with the original voice based on a result of the loss detection or the discontinuity detection, to obtain an aligned test voice and an aligned original voice, wherein the result of the loss detection or the discontinuity detection is used to indicate a manner of aligning the test voice with the original voice; and
at least one of:
inserting a first silent statement before a start time domain location of the first test statement when the test voice has no voice loss or voice discontinuity, and the start time domain location of the first test statement is before a start time domain location of the first original statement, wherein duration of the first silent statement is equal to a time difference between the start time domain location of the first test statement and the start time domain location of the first original statement; or deleting a second silent statement before a start time domain location of the first test statement when the test voice has no voice loss or voice discontinuity, and the start time domain location of the first test statement is after a start time domain location of the first original statement, wherein duration of the second silent statement is equal to a time difference between the start time domain location of the first test statement and the start time domain location of the first original statement.

16. The non-transitory computer-readable storage medium according to claim 15, wherein before the inserting the first silent statement before the start time domain location of the first test statement, or before the deleting the second silent statement before the start time domain location of the first test statement, the aligning the test voice with the original voice based on the result of the loss detection or the discontinuity detection further comprises:

determining at least two original statements based on a silent period in the original voice, wherein the at least two original statements comprise the first original statement, and the silent period in the original voice is used to indicate locations at which the at least two original statements are divided; and determining at least two test statements based on a silent period in the test voice, wherein the at least two test statements comprise the first test statement, and the silent period in the test voice is used to indicate locations at which the at least two test statements are divided.

17. The non-transitory computer-readable storage medium according to claim 15, wherein before the inserting the first silent statement before the start time domain location of the first test statement, or before the deleting the second silent statement before the start time domain location of the first test statement, the aligning the test voice with the original voice based on the result of the loss detection or the discontinuity detection further comprises:

determining a first test sub-statement and a second test sub-statement based on a wave trough of the first test statement, wherein the wave trough is a voice fragment whose amplitude average value of frames is less than or equal to an amplitude threshold in the first test statement, and the wave trough is used to indicate division locations of the first test sub-statement and the second test sub-statement;

determining a first original sub-statement based on a cross-correlation coefficient and the first test sub-statement, wherein the cross-correlation coefficient is used to indicate a similarity between a voice segment of the first original statement and the first test sub-statement, and the first original sub-statement is a voice segment that is in voice segments of the first original statement and that has a highest similarity to the first test sub-statement; and aligning the first test sub-statement with the first original sub-statement based on a time offset of a first time domain location relative to a second time domain location and by using a time domain location of the first original sub-statement as a reference location, wherein the first time domain location is a time domain location of the first test sub-statement in the first test statement, and the second time domain location is a time domain location of the first original sub-statement in the first original statement.

\* \* \* \* \*